(12) United States Patent
Lee

(10) Patent No.: US 10,941,982 B2
(45) Date of Patent: Mar. 9, 2021

(54) REFRIGERATOR

(71) Applicant: LG ELECTRONICS INC., Seoul (KR)

(72) Inventor: Sangmyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/547,826

(22) Filed: Aug. 22, 2019

(65) Prior Publication Data
US 2019/0376738 A1 Dec. 12, 2019

Related U.S. Application Data

(63) Continuation of application No. 15/838,664, filed on Dec. 12, 2017, now Pat. No. 10,436,504.

(30) Foreign Application Priority Data

Dec. 12, 2016 (KR) .................. 10-2016-0169005

(51) Int. Cl.
*F25D 29/00* (2006.01)
*F25D 23/02* (2006.01)
(Continued)

(52) U.S. Cl.
CPC ........... *F25D 29/005* (2013.01); *F25D 23/02* (2013.01); *F25D 23/028* (2013.01);
(Continued)

(58) Field of Classification Search
CPC ............. F25D 23/028; F25D 2400/361; F25D 29/005; F25D 23/02; F25D 27/005;
(Continued)

(56) References Cited

U.S. PATENT DOCUMENTS

| 7,143,599 | B2 | 12/2006 | Wo |
| 2004/0214010 | A1 | 10/2004 | Murata |

(Continued)

FOREIGN PATENT DOCUMENTS

| EP | 3190365 | 7/2017 |
| EP | 3190366 | 7/2017 |

(Continued)

OTHER PUBLICATIONS

Chinese Office Action (with English translation) dated Dec. 3, 2019 issued in CN Application No. 201711306944.1.

(Continued)

*Primary Examiner* — Koosha Sharifi-Tafreshi
(74) *Attorney, Agent, or Firm* — KED & Associates LLP

(57) ABSTRACT

A refrigerator includes a cabinet, a door defining an opening in the door, and a transparent display assembly that covers the opening and allows an inner space of the refrigerator to be visible. The transparent display assembly includes a front panel, a rear panel, an outer spacer configured to maintain a first distance between the front panel and the rear panel, a display disposed on a rear surface of the front panel, a light guide plate spaced apart from the display, and a first spacer configured to support the light guide plate and to maintain a second distance between the display and the light guide plate. The outer spacer defines a first injection hole configured to allow introduction of an inert gas to the outer spacer, and a first insulation layer configured to receive the inert gas between the front panel and the light guide plate.

20 Claims, 30 Drawing Sheets

(51) Int. Cl.
    *F25D 27/00* (2006.01)
    *G06F 3/044* (2006.01)
    *G09G 3/20* (2006.01)

(52) U.S. Cl.
    CPC ........... *F25D 27/005* (2013.01); *G06F 3/044* (2013.01); *G09G 3/2096* (2013.01); *F25D 2400/361* (2013.01); *F25D 2400/40* (2013.01); *G09G 2310/08* (2013.01)

(58) Field of Classification Search
    CPC ........... F25D 2323/021; F25D 2400/36; F25D 2323/023; A47F 3/0434
    See application file for complete search history.

(56) References Cited

U.S. PATENT DOCUMENTS

| | | | |
|---|---|---|---|
| 2006/0145576 A1* | 7/2006 | Lee | F16M 11/24 312/406 |
| 2010/0045617 A1 | 2/2010 | Lee | |
| 2013/0063326 A1 | 3/2013 | Riegel | |
| 2014/0144083 A1* | 5/2014 | Artwohl | G02F 1/1313 49/70 |

FOREIGN PATENT DOCUMENTS

| | | |
|---|---|---|
| JP | 3868725 | 1/2007 |
| KR | 10-2011-0089535 | 8/2013 |
| SE | 0004068 | 8/2001 |
| WO | WO 2016/122041 | 8/2016 |

OTHER PUBLICATIONS

European Extended Search Report dated May 2 2018 issued in EP Application No. 17206357.0.
U.S. Office Action dated Jan. 17, 2019 issued in U.S. Appl. No. 15/838,664.

* cited by examiner

REFRIGERATOR

CROSS-REFERENCE TO RELATED APPLICATIONS

This application is a Continuation of U.S. application Ser. No. 15/838,664, filed Dec. 12, 2017, which claims priority under 35 U.S.C. 119 and 35 U.S.C. 365 to Korean Patent Application No. 10-2016-0169005, filed Dec. 12, 2016, which are hereby incorporated by reference.

BACKGROUND

The present disclosure relates to a refrigerator.

In general, refrigerators are home appliances for storing foods at a low temperature in a storage space that is covered by a door. For this, refrigerators cool the inside of the storage space by using cool air generated by being heat-exchanged with a refrigerant circulated through a refrigeration cycle to store foods in an optimum state.

In recent years, refrigerators tend to increase in size more and more, and multi-functions are applied to refrigerators as dietary life changes and high-quality is pursued, and accordingly, refrigerators of various structures for user convenience and efficient use of an internal space are being brought to the market.

A storage space of such a refrigerator may be opened and closed by a door. Also, refrigerators may be classified into various types according to an arranged configuration of the storage space and a structure of the door for opening and closing the storage space.

Generally, the refrigerator has a limitation that foods stored therein are not confirmed unless the door is not opened. That is, the door has to be opened to confirm that a desired food is stored in the refrigerator or in a separate storage space provided in the door. In addition, if the stored position of the food is not known precisely, an opened time of the door may increase, or the number of times for opening the door increases. In this case, there is a limitation that unnecessary leakage of cool air occurs.

In recent years, to solve such a limitation, a refrigerator has been developed while allows a portion of a door thereof to be transparent or allows the inside thereof to be seen from the outside.

SUMMARY

Embodiments provide a refrigerator in which at least a portion of a refrigerator door is selectively transparent by user's manipulation to allow the user to see the inside of the refrigerator even though the refrigerator door is closed, and simultaneously, to selectively output a screen.

Embodiments also provide a refrigerator in which a see-through part constituting a portion of a door is capable of being transparent or opaque or outputting a screen according to selective turn-on/off of a door light or a display light.

Embodiments also provide a refrigerator in which a PCB and a cable connected to the PCB are disposed in a door, which is capable of seeing through the inside of the refrigerator by a transparent display assembly, without being exposed through the transparent display.

Embodiments also provide a refrigerator which is capable of improving insulation performance of a transparent display assembly through which the inside of a door is seen.

Embodiments also provide a refrigerator that is capable of preventing power consumption from increasing by a loss of cool air through a door.

Embodiments also provide a refrigerator which is capable of satisfying insulation performance while maintaining a thickness of a door of which at least a portion is transparent.

Embodiments also provide a structure of a door into which a gas for insulation is capable of being injected and which includes a transparent display assembly.

In one embodiment, a refrigerator includes: a cabinet defining a storage space; a door opening and closing the cabinet; and a transparent display assembly which covers an opening of the door and through which an inner space of the refrigerator is seen, wherein the transparent display assembly includes: a front panel defining at least a portion of a front surface of the door; a rear panel defining at least a portion of a rear surface of the door; an outer spacer maintaining a distance between the front panel and the rear panel and disposed along circumferences of the front panel and the rear panel to define a sealed space therein; a display disposed on a rear surface of the front panel in the sealed space; a light guide plate spaced apart from the display to brighten up the display; and a first spacer supporting the light guide plate in the sealed space and maintaining a distance between the display and the light guide plate, wherein an inert gas is injected between the front panel and the light guide plate through an injection hole of the outer spacer to provide an insulation layer.

A source board passing between the front panel and the first spacer to extend to the outside of the first spacer may be disposed on one end of the display.

The source board may be disposed in a space between the first spacer and the outer spacer.

The source board may be disposed perpendicular to the front panel.

A display cable connecting the source board to a T-CON board disposed outside the transparent display assembly may pass between the outer spacer and the front panel.

A touch sensor for user's touch manipulation of the front panel may be disposed on the rear surface of the front panel, and the touch sensor may be connected to a PCB disposed outside the transparent display assembly by a touch cable.

A display light emitting light to an end of the light guide plate may be disposed on inner upper ends facing each other of the outer spacer, and a display light cable connected to a PCB disposed outside the transparent display assembly may pass between the outer spacer and the rear panel.

The cable may have a flexible film shape.

The first spacer may support both left and right ends of the light guide plate, and a light guide plate support part protruding to support upper and lower ends of the light guide plate may be disposed on the outer spacer.

A sealant may be applied to an outer surface of the outer spacer, and the injection hole may be covered by the sealant.

The inner space of the outer spacer may communicate with a space between the front panel and the light guide plate.

A second spacer disposed along a circumference of the light guide plate and coming into contact with the rear panel to define a closed space between the light guide plate and the rear panel may be provided, and an injection hole may be further provided in the second spacer to allow the inert gas injected through the outer spacer to be introduced and thereby to provide a second insulation layer between the light guide plate and the rear panel.

The injection defined in the outer spacer and the injection hole defined in the second spacer may be provided on the same extension line.

The refrigerator may further include: an insulation panel disposed between the light guide plate and the rear panel; a third spacer disposed along a circumference of the insulation panel and coming into contact with the light guide plate to define a closed space between the light guide plate and the insulation panel; and a fourth spacer disposed along the circumference of the insulation panel and coming into contact with the rear panel to define a closed space between the insulation panel and the rear panel.

The inert gas may be injected into the closed spaces defined by the third spacer and the fourth spacer to provide a third insulation layer and a fourth insulation layer, respectively.

The transparent display assembly may include: a module in which the display, the first spacer, and the outer spacer are mounted on the front panel; and a module in which the fourth spacer, the insulation panel, the third spacer, and the light guide plate are mounted on the rear panel to provide the third insulation layer and the fourth insulation layer, wherein the module of the font panel and the module of the rear panel may be coupled to each other.

An injection hole may be further defined in each of the third spacer and the fourth spacer, and the inert gas injected through the outer spacer may be introduced to provide a third insulation layer between the light guide plate and the insulation panel and a fourth insulation layer between the insulation panel and the rear panel.

Each of the third spacer and the fourth spacer may include: a hollow tube member having both opened ends to define upper/lower and left/right ends thereof; a corner connection member connecting both ends of the tube member, which are adjacent to cross each other, wherein a connection member injection hole communicating the sealed space of the outer spacer and the closed spaces of the third and fourth spacers so that the inert gas is introduced may be further defined in the corner member.

A second spacer disposed along a circumference of the light guide plate and coming into contact with the rear panel to define a closed space between the light guide plate and the rear panel may be provided, wherein the second spacer may include: a hollow tube member having both opened end to define upper/lower and left/right ends thereof; and a corner connection member connecting both ends of the tube member, which are adjacent to cross each other, wherein a connection member injection hole communicating the sealed space of the outer spacer and the closed space of the second spacer so that the inert gas is introduced may be further defined in the corner member.

A moisture absorbent may be filled in the tube member, and a plurality of punched holes communicating with the closed space may be defined in an inner surface of the second spacer.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
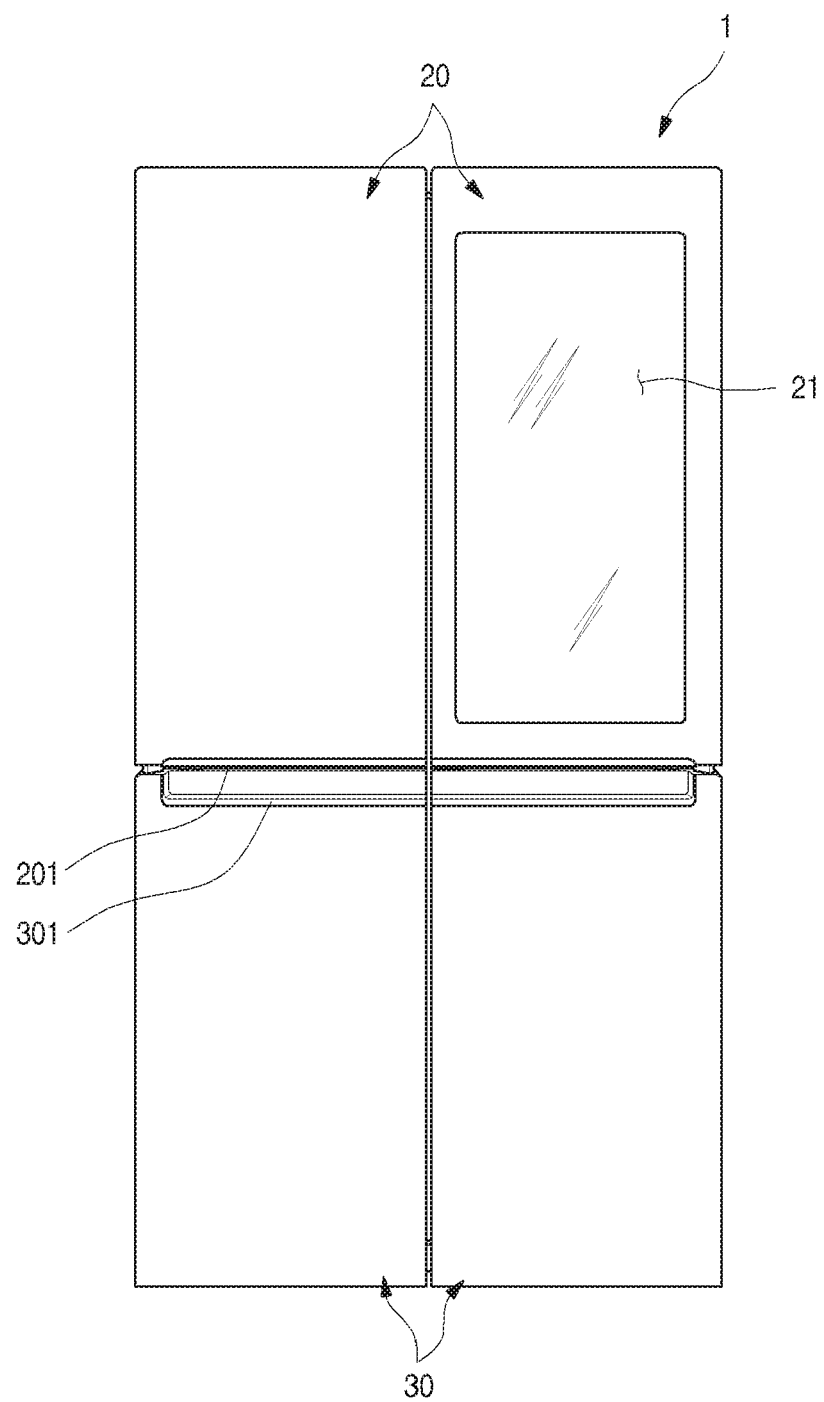
FIG. 1 is a front view of a refrigerator according to a first embodiment.

FIG. 1 is a front view of a refrigerator according to a first embodiment. Also, FIG. 2 is a perspective view of the refrigerator.

Figure 2:
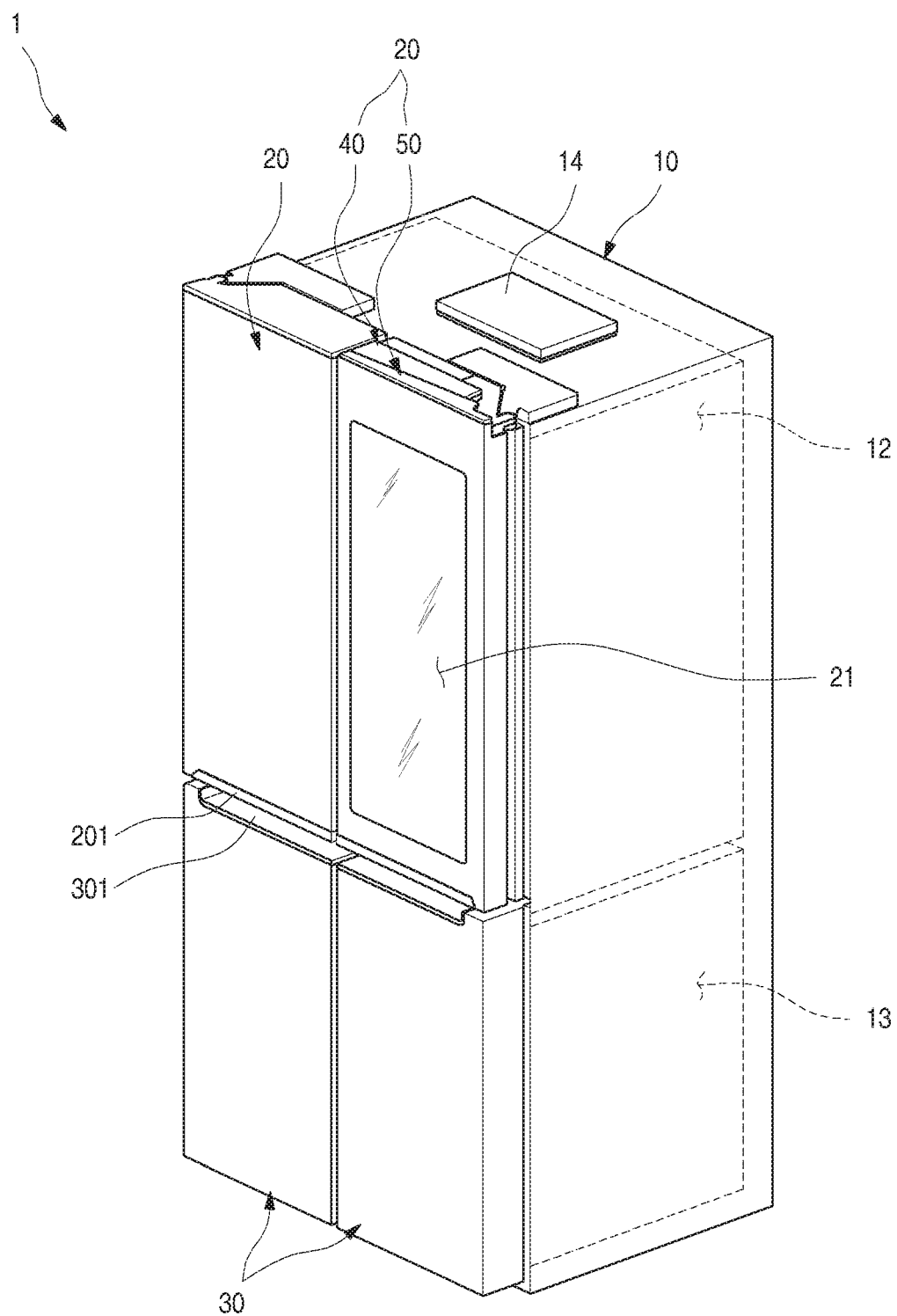
FIG. 2 is a perspective view of the refrigerator.

Referring to FIGS. 1 and 2, a refrigerator 1 according to a first embodiment includes a cabinet 10 defining a storage space and a door that opens or closes the storage space. Here, an outer appearance of the refrigerator 1 may be defined by the cabinet 10 and the door.

Figure 11:
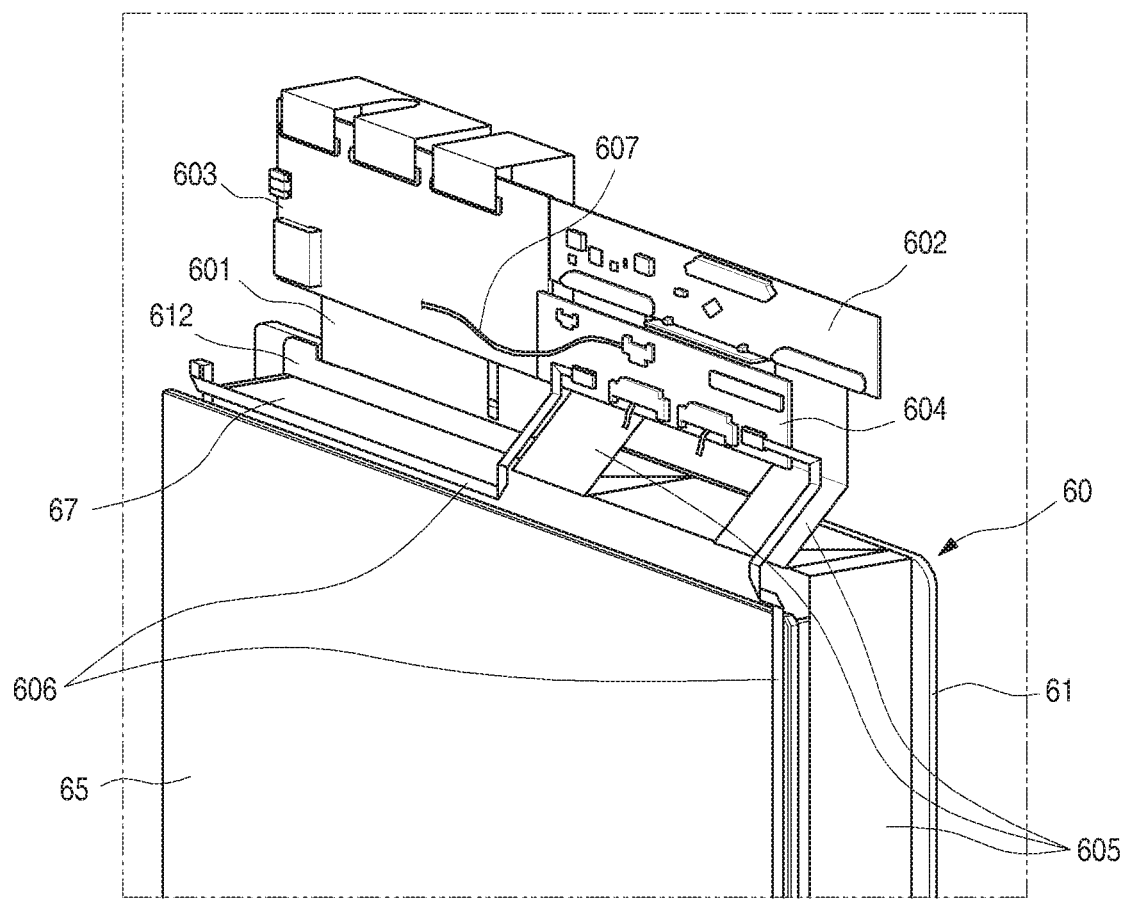
FIG. 11 is a partial perspective view illustrating a state in which a PCB is disposed on an upper portion of the transparent display assembly.

The inside of the cabinet 10 is partitioned into upper and lower portions by a barrier (see FIG. 11). A refrigerating compartment 12 may be defined in the upper portion of the cabinet 10, and a freezing compartment 13 may be defined in the lower portion of the cabinet 10.

Also, a control unit 14 for controlling an overall operation of the refrigerator 1 may be disposed on a top surface of the cabinet 10. The control unit 14 may be configured to control a cooling operation of the refrigerator as well as electric components for selective see-through and screen output of a see-through part 21.

The door may include a refrigerating compartment door and a freezing compartment door 30. The refrigerating compartment door 20 may be opened and closed by rotating an opened front surface of the refrigerating compartment 12, and the freezing compartment door 30 may be switched by rotating an opened front surface of the freezing compartment 13.

Also, the refrigerating compartment door 20 may be provided in a pair of left and right doors. Thus, the refrigerating compartment 12 is covered by the pair of doors. The freezing compartment door 30 may be provided in a pair of left and right doors. Thus, the freezing compartment 13 may be opened and closed by the pair of doors. Alternatively, the freezing compartment door 30 may be withdrawable in a draw type as necessary and provided as one or more doors.

Although a refrigerator in which, a French type door in which a pair of doors rotate to open and close one space is applied to a bottom freezer type refrigerator in which the freezing compartment 13 is provided at a lower portion, is described as an example in this embodiment, the present disclosure may be applied to all types of refrigerators including door without being limited to shapes of the refrigerators.

Also, recessed handle grooves 201 and 301 may be provided in a lower end of the refrigerating compartment door 20 and an upper end of the freezing compartment door 30. A user may insert a his/her hand into the handle groove 201 or 301 to open and close the refrigerating compartment door 20 or the freezing compartment door 30.

At least one door may be provided so that the inside of the refrigerator is seen through the door. A see-through part 21 that is an area, through which the storage space in the rear surface of the door and/or the inside of the refrigerator are seen, may be provided in the refrigerating compartment door 20. The see-through part 21 may constitute at least a portion of a front surface of the refrigerating compartment door 20. The see-through part 21 may be selectively transparent or opaque according to user's manipulation. Thus, foods accommodated in the refrigerator may be accurately identified through the see-through part 21.

Also, although the structure in which the see-through part 21 is provided in the refrigerating compartment door 20 is described as an example in this embodiment, the see-through part 21 may be provided in different types of refrigerator doors such as the freezing compartment door 30 according to a structure and configuration of the refrigerator.

Figure 3:
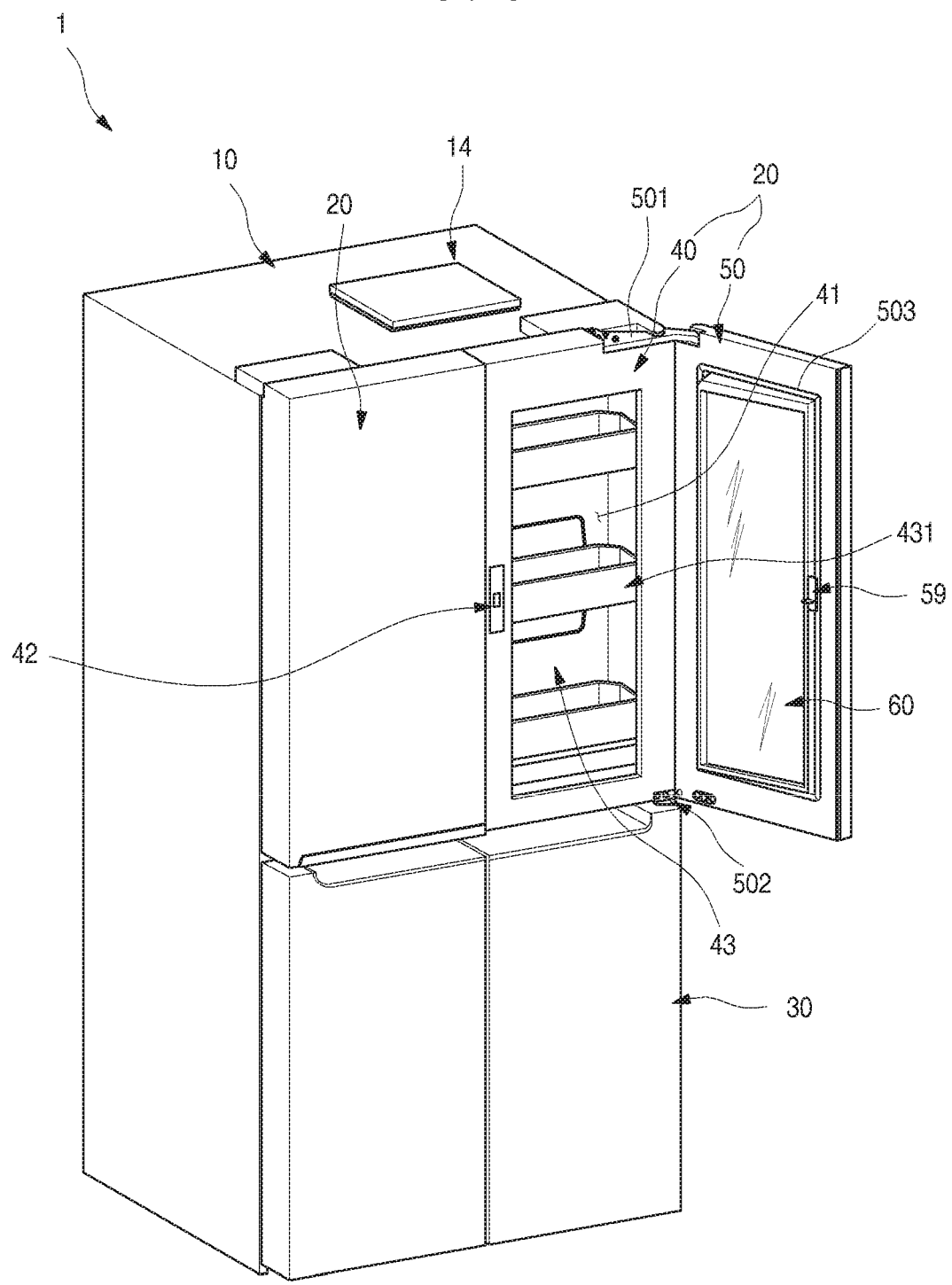
FIG. 3 is a perspective view of the refrigerator with a sub door opened.

FIG. 3 is a perspective view of the refrigerator with a sub door opened. Also, FIG. 4 is a perspective view of the refrigerator with a main door opened.

Figure 4:
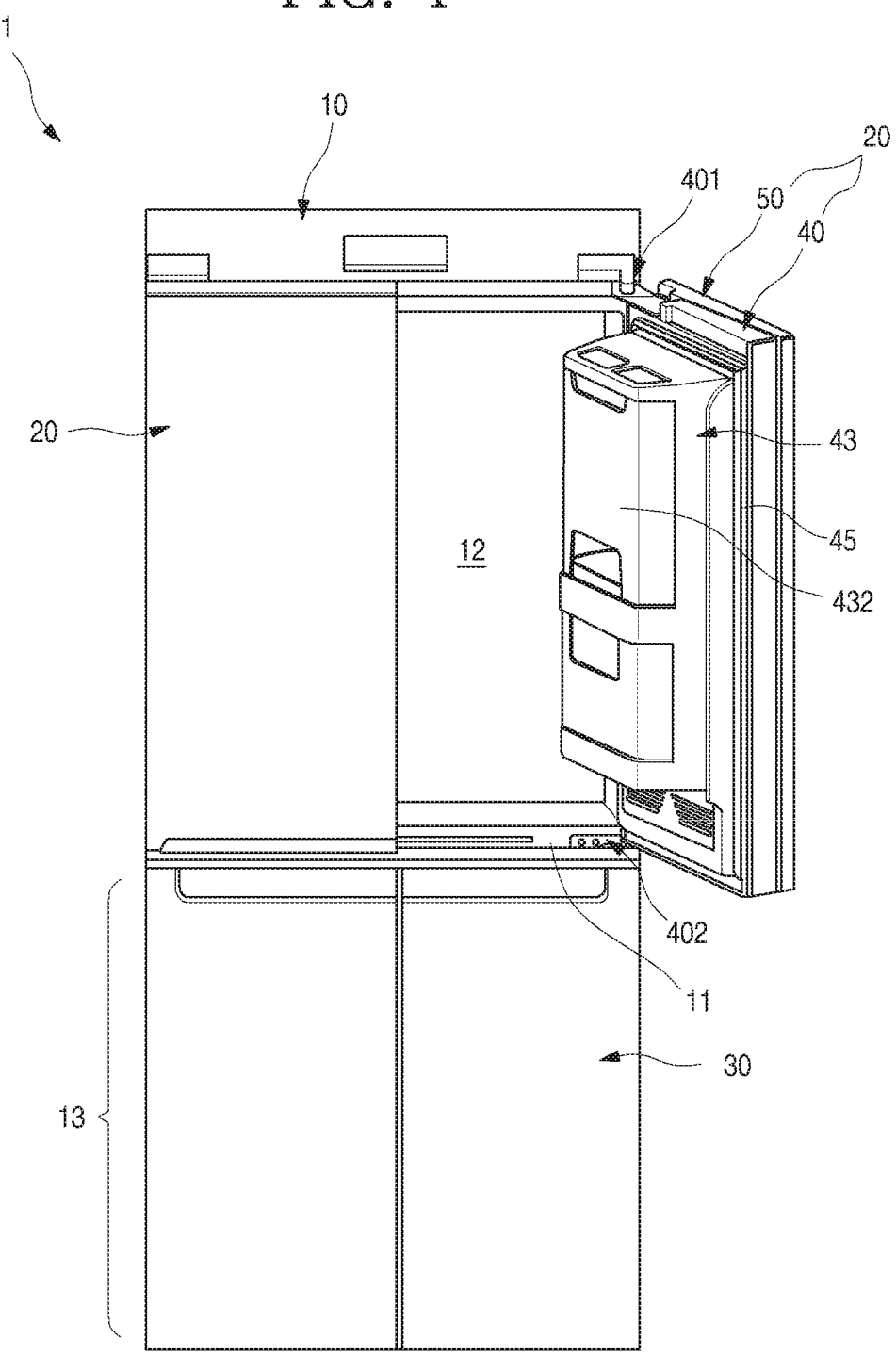
FIG. 4 is a perspective view of the refrigerator with a main door opened.

As illustrated in FIGS. 3 and 4, the refrigerating compartment door 20, which is disposed at the right side (when viewed in FIG. 3), of the pair of refrigerating compartment doors 20 may be doubly opened and closed. In detail, the refrigerating compartment door 20, which is disposed at the right side, may include a main door 40 that opening and closing the refrigerating compartment 12 and a sub door 50 rotatably disposed on the main door 40 to open and close an opening defined in the main door 40.

The main door 40 may have the same size as that of the refrigerating compartment door 20, which is disposed at the left side (when viewed in FIG. 1), of the pair of refrigerating compartment doors 20. The main door 40 may be rotatably mounted on the cabinet 10 by an upper hinge 401 and a lower hinge 402 to open at least a portion of the refrigerating compartment door 20.

Also, an opening 41 that is opened with a predetermined size is defined in the main door 40. A door basket 431 may be mounted on the rear surface of the main door 40 as well as the inside of the opening 41. Here, the opening 41 may have a size that occupies most of the front surface of the main door 40 except for a portion of a circumference of the main door 40.

Also, a main gasket 45 may be disposed on a circumference of the rear surface of the main door 40 to prevent cool air within an internal space of the cabinet 10 from leaking when the main door 40 is opened.

The sub door 50 may be rotatably mounted on the front surface of the main door 40 to open and close the opening 41. Thus, the sub door 50 may be opened to expose the opening 41.

The sub door 50 may have the same size as the main door 40 to cover the entire front surface of the main door 40. Also, when the sub door 50 is closed, the main door 40 and the sub door 50 may be coupled to each other to provide the same size and configuration as those of the left refrigerating compartment door 20. Also, a sub gasket 503 may be disposed on the rear surface of the sub door 50 to seal a gap between the main door 40 and the sub door 50.

A transparent display assembly 60 that selectively sees the inside and outputs a screen may be disposed at a center of the sub door 50. Thus, even though the sub door 50 is closed, the inside of the opening 41 may be selectively seen, and also an image inside the opening 41 may be outputted. The see-through part 21 may be a portion of the sub door 50, through which the inside of the refrigerator 1 is seen. However, the see-through part 21 may not necessarily match the entirety of the transparent display assembly 60.

The transparent display assembly 60 may be configured to be selectively transparent or opaque according to user's manipulation. Thus, only when the user desires, the transparent display assembly 60 may be transparent so that the inside of the refrigerator 1 is visualized, otherwise, be maintained in the opaque state. Also, the transparent display assembly 60 may output a screen in the transparent or opaque state.

A sub upper hinge 501 and a sub lower hinge 502 may be respectively provided on upper and lower ends of the sub door 50 so that the sub door 50 is rotatably mounted on the front surface of the main door 40. Also, an opening device 59 may be provided on the sub door 50. A locking unit 42 may be provided on the main door 40 to correspond to the opening device 59. Thus, the sub door 50 may be maintained in the closed state by the coupling between the opening device 59 and the locking unit 42. When the coupling between the opening device 59 and the locking unit 42 is released by manipulation of the opening device 59, the sub door 50 may be opened with respect to the main door 40.

Also, a damping device 504 (see FIG. 6) may be provided on a lower end of the sub door 50. The damping device 504 may be disposed on edges of the lower end and lateral end of the sub door 50, which are adjacent to the sub lower hinge 502, so that an impact is damped when the sub door 50 having a relatively heavy weight by the transparent display assembly 60 is closed.

An accommodation case 43 may be provided in the rear surface of the main door 40. A plurality of door baskets 431 may be disposed on the accommodation case 43, and a case door 432 may be provided on the accommodation case 43.

Figure 5:
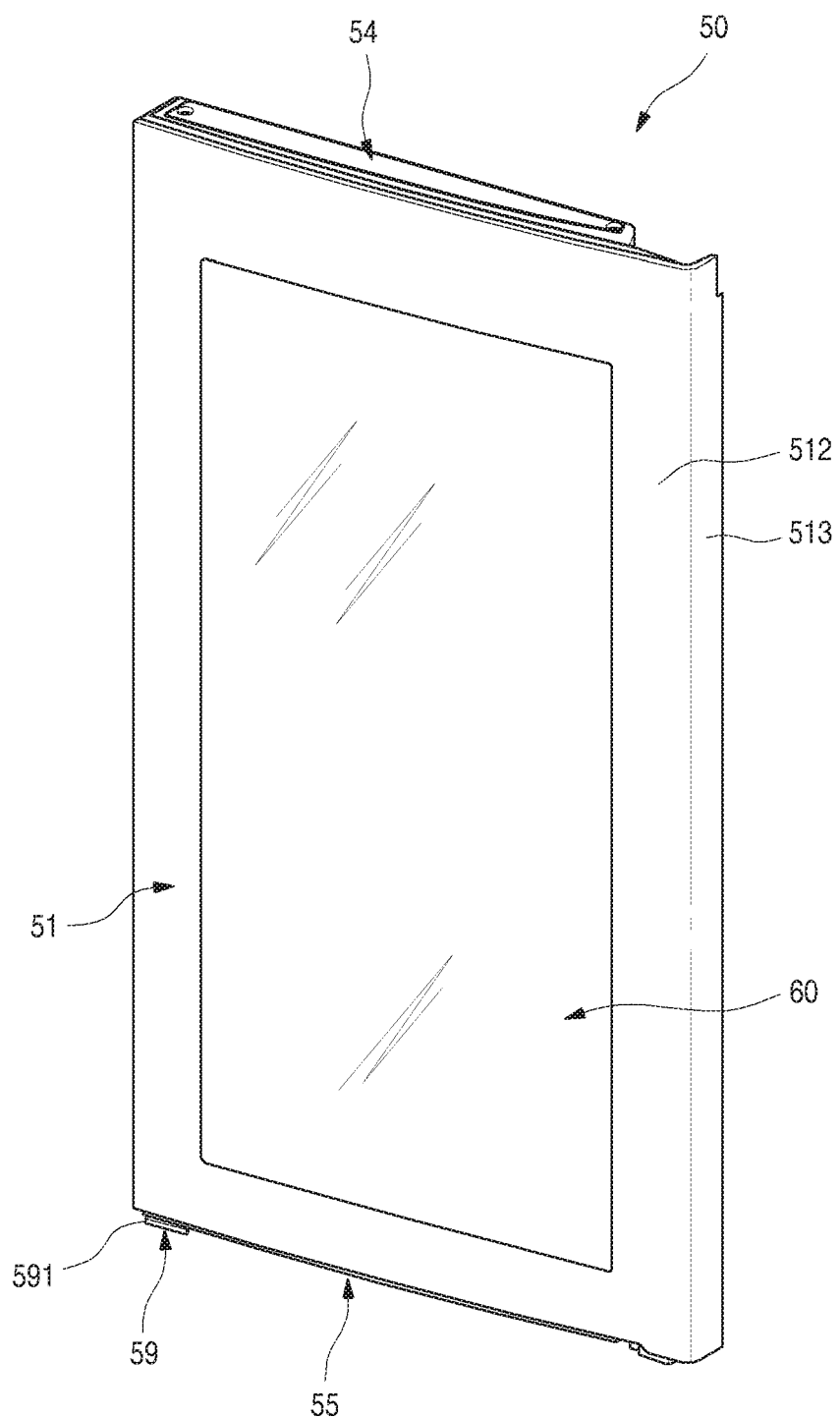
FIG. 5 is a perspective view of the sub door when viewed from a front side.
Figure 6:
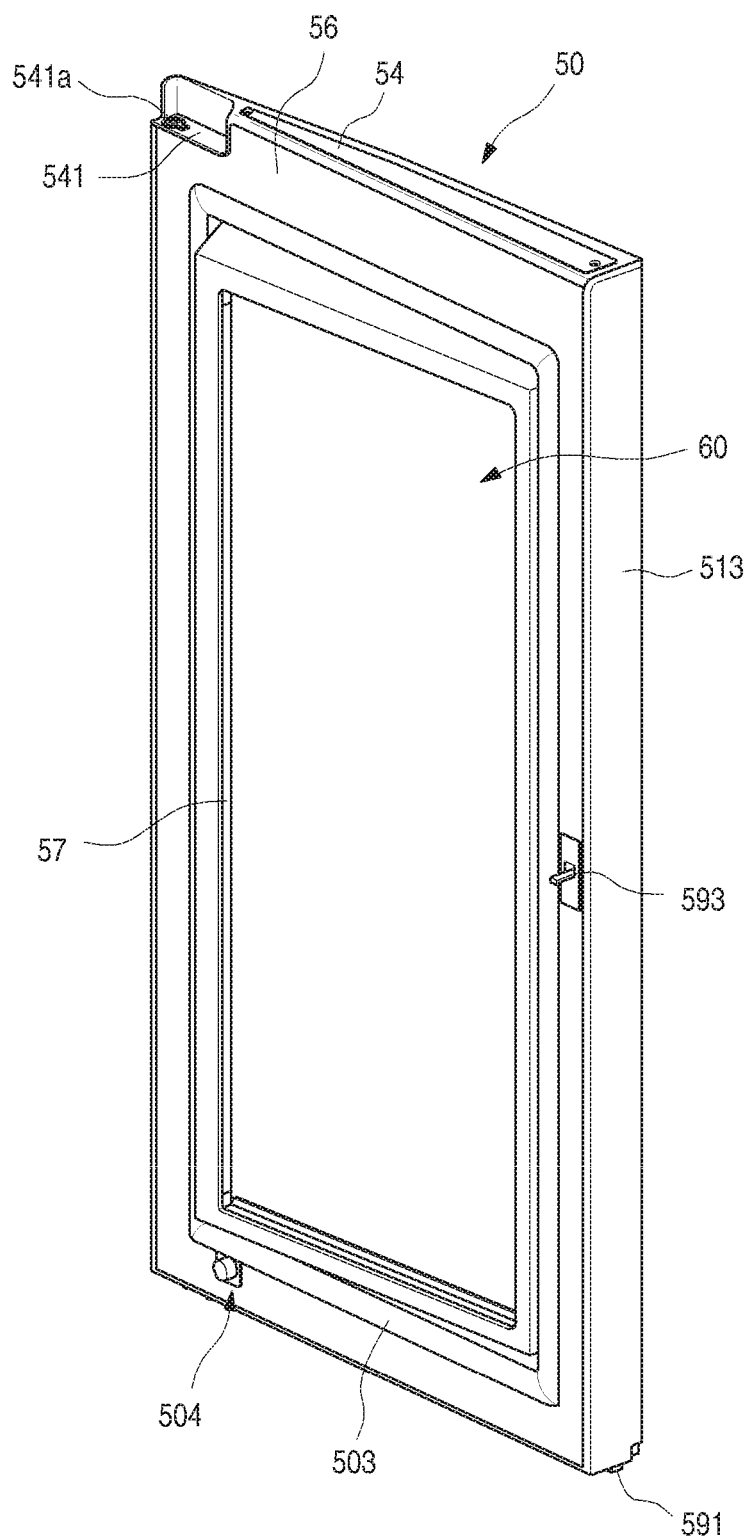
FIG. 6 is a perspective view of the sub door when viewed from a rear side.
Figure 7:
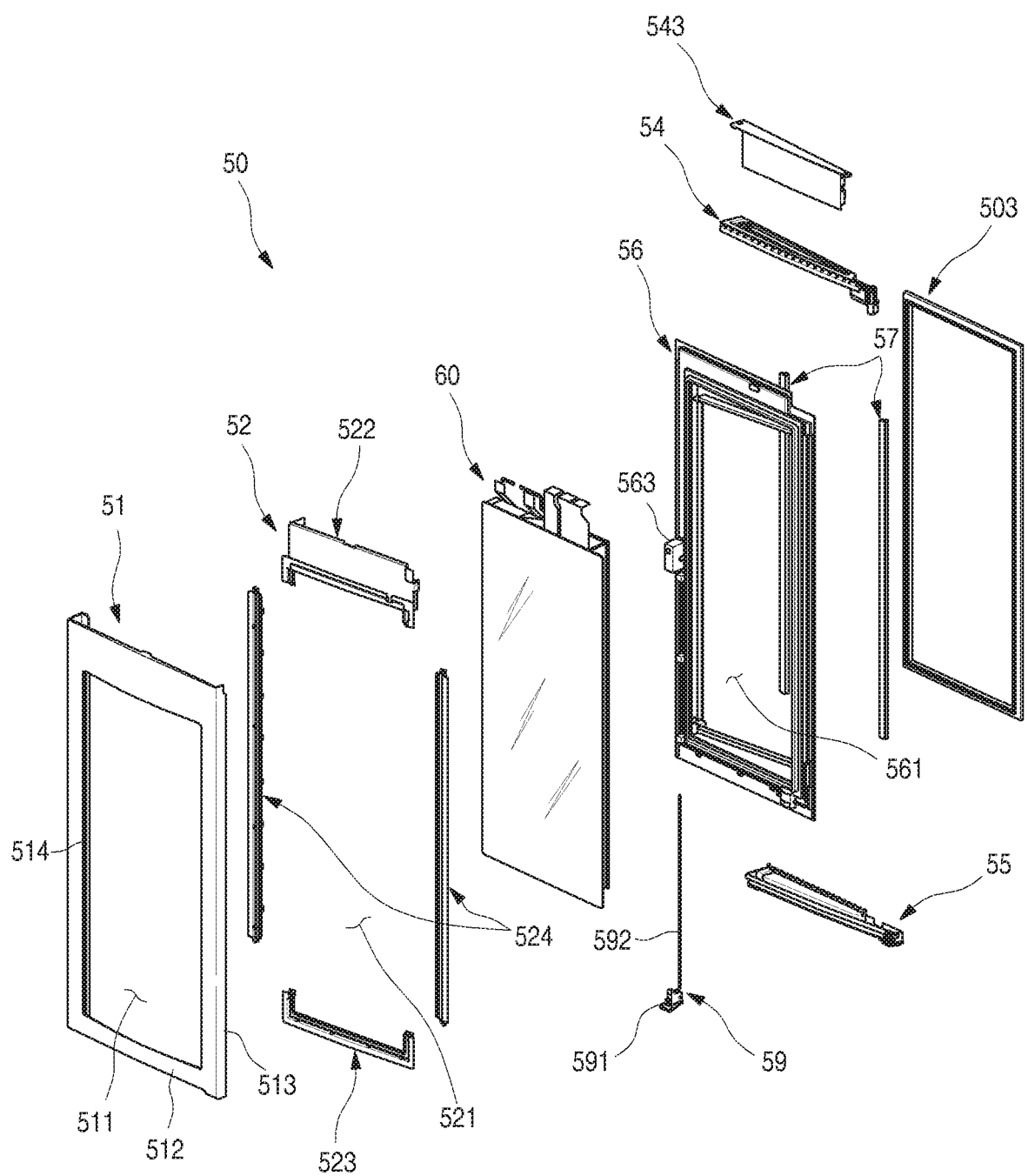
FIG. 7 is an exploded perspective view of the sub door.

FIG. 5 is a perspective view of the sub door when viewed from a front side. FIG. 6 is a perspective view of the sub door when viewed from a rear side. Also, FIG. 7 is an exploded perspective view of the sub door.

As illustrated in the drawings, the sub door 50 may include an outer plate 51 defining an outer appearance of the sub door 50, a door liner 56 mounted to be spaced apart from the outer plate 51, the transparent display assembly 60 mounted on an opening of the outer plate 51 and the door liner 56, and upper and lower cap decos 54 and 55 defining the top and bottom surfaces of the sub door 50. The above-described constituents may be coupled to define the whole outer appearance of the sub door 50.

The outer plate 51 may constitute an outer appearance of the front surface of the sub door 50 and a portion of a circumferential surface of the sub door 50 and be made of a stainless steel material. The outer plate 51 may constitute a portion of the outer appearance of the sub door 50 as well as the front surface of the sub door 50. Also, the outer plate 51 may be made of the same material of the front surface of each of the refrigerating compartment door 20 and the freezing compartment door 30. Various surface treatments such as coating or film attachment so as to realize anti-fingerprint coating, hair lines, colors, or patterns may be performed on the front surface of the outer plate 51.

The outer plate 51 may include a front part 512 defining the outer appearance of the front surface and a side part 513 defining an outer appearance of the side surface that is exposed to the outside. Also, a plate opening 511 may be defined at a center of the front part 512. Here, the plate opening 511 may be covered by the transparent display assembly 60. Also, since the inside of the refrigerator 1 is seen through the transparent display assembly 60 covering the plate opening 511, the inside of the plate opening 511 is called the see-through part 21.

The front part 512 may have a curvature that gradually decreases outward from a central side of the refrigerator 1 as a whole. The front part 512 may be rounded to correspond to the front surface of the refrigerating compartment door 20, which is adjacent to the front part 512. Thus, the outer appearance of the front surface of the refrigerator 1 may be three-dimensionally viewed as a whole.

Also, an opening bent part 514 that is bent backward may be disposed on a circumferential surface of the plate opening 511. The opening bent part 514 may be disposed along a circumference of the plate opening 511 and extend by a predetermined length so as to be inserted into and fixed to an inner frame 52 that will be described below. Thus, the plate opening 511 may be defined by the opening bent part 514.

The side part 513 that is bent backward may be disposed on each of both ends of the front part 512. The side part 513 may define an outer appearance of the side surface of the sub door 50. Also, an end of the side part 513 may also be bent inward to be coupled to the door liner 56.

Upper and lower ends of the outer plate 51 may also be bent to be coupled to the upper cap deco 54 and the lower cap deco 55. Thus, the outer plate 51 may define the outer appearance of the sub door 50 by being coupled to the door liner 56 and the upper and lower cap decos 54 and 55.

The door liner 56 defines the rear surface of the sub door 50 and has a door liner opening 561 in the area on which the transparent display assembly 60 is disposed. Also, a sub gasket 503 for sealing a gap between the sub door 50 and the main door 40 may be mounted on the rear surface of the door liner 56.

Also, a door light 57 may be provided on each of both sides of the door liner opening 561. The door light 57 may illuminate the rear surface of the sub door 50 and a rear side of the transparent display assembly 60.

Thus, the door light 57 may illuminate an inner space of the accommodation case 43, and simultaneously, serve as an auxiliary backlight function of the transparent display assembly 60 to more clearly output a screen of the transparent display assembly 60. When the door light 57 is turned on, the inside of the accommodation case 43 may be brightened up, and thus, the inside of the refrigerator 1 may be more brightened up than the outside of the refrigerator 1 so that the inside of the refrigerator 1 may be visualized through the transparent display assembly 60.

The door light 57 may be disposed on both sides of the transparent display assembly 60 in directions facing each other. The mounted position of the door light 57 may variously vary as long as the door light 57 has sufficient brightness at the rear side of the sub door.

Also, the opening device 59 may be mounted on the door liner 56. The opening device 59 may include a manipulation member 591 exposed to the lower end of the sub door 50, a load 592 extending from the manipulation member 591, and a locking member 593 protruding from the rear surface of the door liner 56. The user may manipulate the manipulation member 591 to allow the load 592 to move the locking member 593 so that the sub door 50 is selectively restricted by the main door 40 and also to manipulate the opening and closing of the sub door 50.

The upper cap deco 54 may define a top surface of the sub door 50 and be coupled to upper ends of the outer plate 51 and the door liner 56. Also, a sub upper hinge mounting part 541 may be disposed on one end of the upper cap deco 54, and a hinge hole 541*a* into which a hinge shaft of the upper hinge 401 is inserted may be defined in the sub upper hinge mounting part 541. A structure of the upper cap deco 54 will be described below in more detail.

The lower cap deco 55 may define a bottom surface of the sub door 50 and be coupled to lower ends of the outer plate 51 and the door liner 56.

The transparent display assembly 60 may be disposed between the outer plate 51 and the door liner 56. Also, the transparent display assembly 60 may be configured to cover the plate opening 511 and the door liner opening 561. Also, the transparent display assembly 60 may be selectively manipulated to one state of transparent, translucent, opaque, and screen output states by the user.

Thus, the user may selectively see through the inner space of the sub door 50 through the transparent display assembly 60 and see the screen outputted through the transparent display assembly 60.

The inner frame 52 for supporting the transparent display assembly 60 is mounted on a circumference of the plate opening 511 of the outer plate 51. The transparent display assembly 60 may be fixed and mounted on the outer plate 51 by the inner frame 52. Particularly, a front surface of the outer plate 51 and the front surface of the transparent display assembly 60 may be disposed on the same extension line so that the front surface of the sub door 50 has a sense of unity.

A frame opening 521 is defined at a center of the inner frame 52. The frame opening 521 has a size somewhat less than that of the plate opening 511 and has a structure in which the transparent display assembly 60 is seated thereon. Also, the frame opening 521 may have a size less than that of the front panel 61 and greater than that of the rear panel 65. Thus, when the transparent display assembly 60 is mounted, the rear panel 65 may successively pass through the plate opening 511 and the frame opening 521 and then be seated on the door liner 56.

Also, the inner frame 52 may have a coupling structure with the outer plate 51. Here, the outer plate 51 and an end of the transparent display assembly 60 may be mounted on the inner frame 52 in a state in which the outer plate 51 and the end of the transparent display assembly 60 are closely attached to each other.

Thus, in the transparent display assembly 60 is mounted, the inner frame 52 may support a rear surface of the plate opening 511 of the outer plate 51 and a rear surface of the circumference of the transparent display assembly 60 at the same time. Also, in the state in which the transparent display assembly 60 is mounted, the front surface of the outer plate 51 and the front surface of the transparent display assembly 60 may be disposed on the same plane without being stepped with respect to each other.

Figure 8:
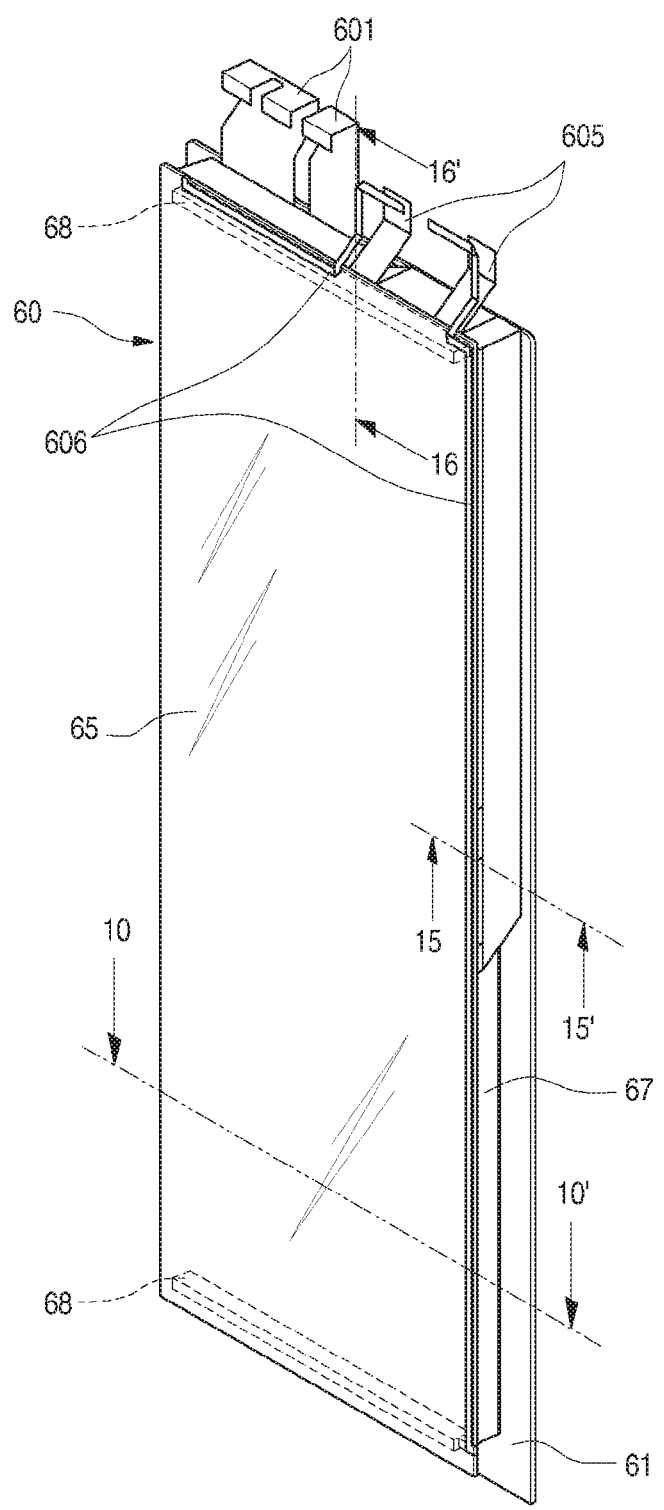
FIG. 8 is a perspective view of a transparent display assembly according to the first embodiment.
Figure 9:
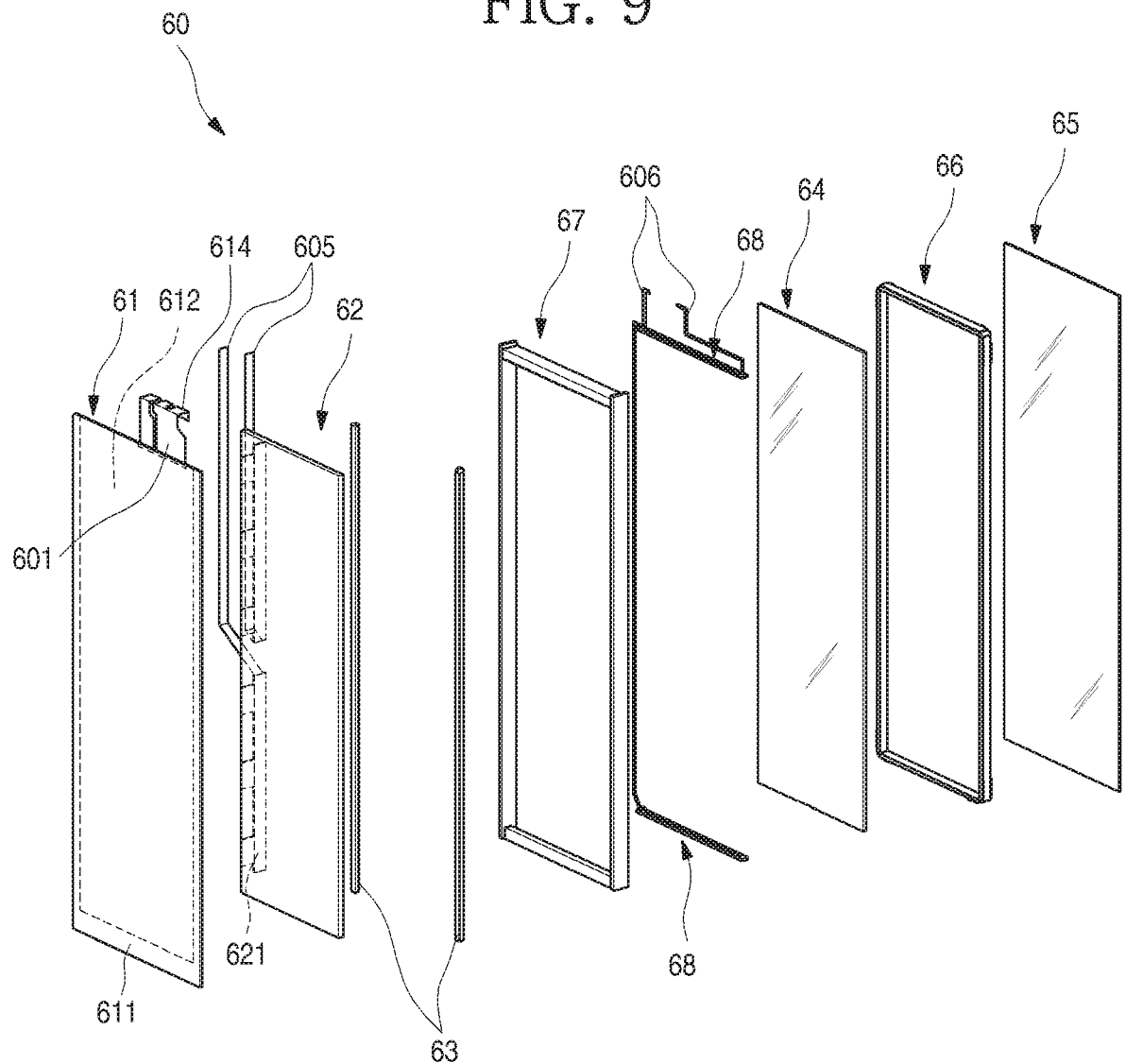
FIG. 9 is an exploded perspective view of the transparent display assembly.
Figure 10:
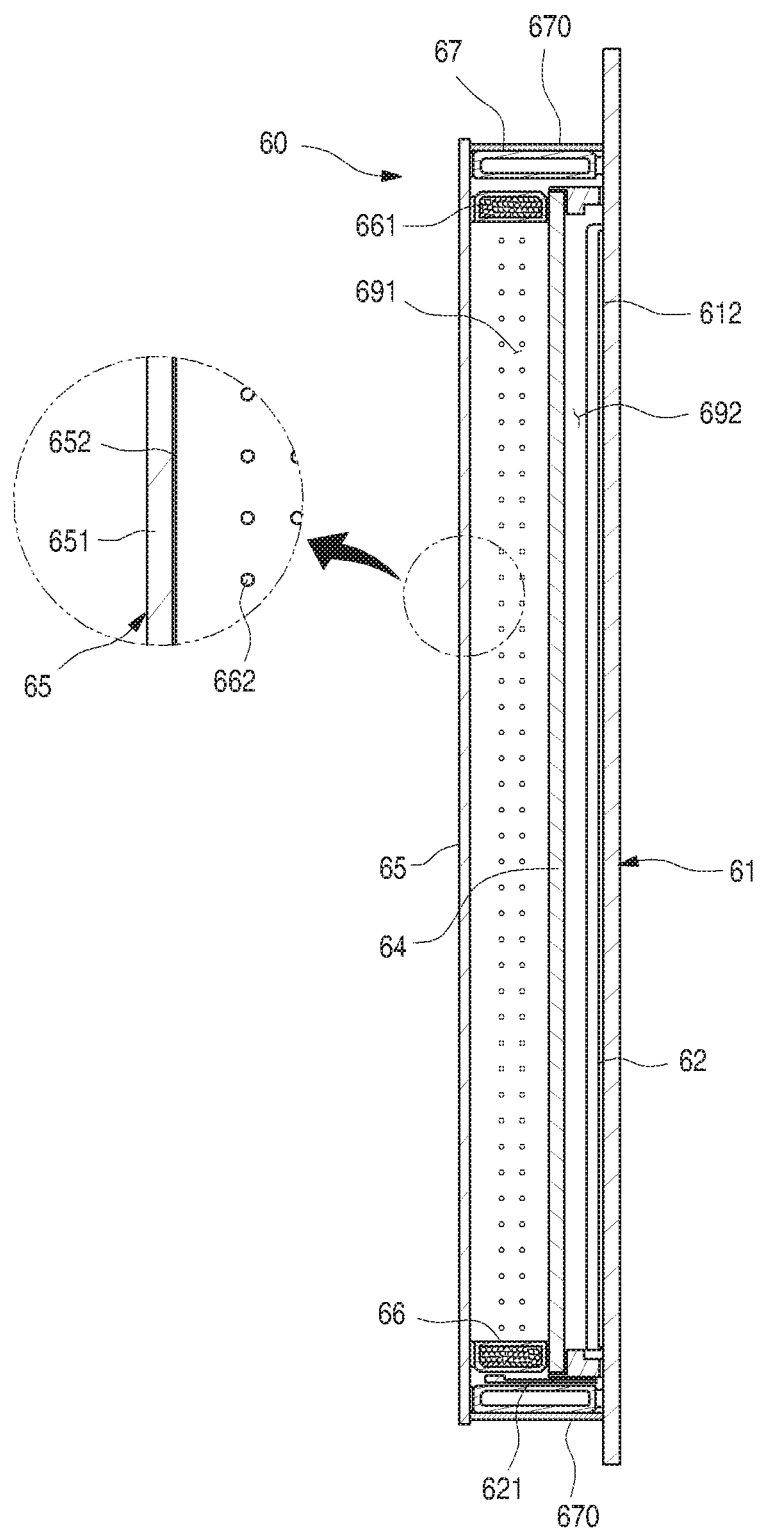
FIG. 10 is a cross-sectional view taken along line 10-10' of FIG. 8.

FIG. 8 is a perspective view of the transparent display assembly according to the first embodiment. Also, FIG. 9 is an exploded perspective view of the transparent display assembly. Also, FIG. 10 is a cross-sectional view taken along line 10-10' of FIG. 8.

As illustrated in the drawings, the transparent display assembly 60 may have a size that is enough to cover the plate opening 511 and the linear opening 561 inside the sub door 50. Also, the see-through part 21 may be provided in the transparent display assembly 60 so that the inner space of the refrigerator is selectively seen, and a screen is outputted.

In more detail with respect to the transparent display assembly 60, the transparent display assembly 60 may have an outer appearance that is defined by the front panel 61 and the rear panel 65, which define the front and rear surfaces of the transparent display assembly 60, and the outer spacer 67 connecting the front panel 61 to the rear panel 65.

Also, a display 62 and a light guide plate 64 may be disposed between the front panel 61 and the rear panel 65. In addition, a first spacer 63 for supporting the display 62 and the light guide plate 64 may be further provided, and a display light 68 for emitting light to the light guide plate 64 may be provided.

In more detail, the front panel 61 may be made of a transparent glass material that defines an outer appearance of the front surface of the transparent display assembly 60. The front panel 61 may be made of a different material through which the inside of the front panel 61 is seen, and a touch input is enabled.

In detail, the front panel 61 may be made of a material such as transparent blue glass so that the inside thereof is seen, and the touch sensor 612 may be attached to the front panel 61 to input manipulation for driving the display 62. Thus, the user may touch-manipulate the surface of the front panel 61, and the touch sensor 612 may recognize the touch manipulation to generate a signal for the operation of the display 62 or the refrigerator 1.

Accordingly, the front panel 61 may perform a function for inputting an operation of the display 62 or the refrigerator in addition to the see-through function. An insulation coating layer 652 that will be described below is not provided on the surface of the front panel 61 so that an accurate touch input of the touch sensor 612 that operates in an electrostatic capacity manner is performed.

The front panel 61 may have a size greater than that of the plate opening 511 and be supported by the inner frame 52. That is, when the transparent display assembly 60 is assembled and mounted from the rear side, a circumferential portion of the front panel 61 may be supported by the rear surface of the inner frame 52.

In detail, a front protrusion 613 that further protrudes outward than the rear panel may be disposed on the front panel 61. The front protrusion 613 may have a length greater than that of the rear panel 65 in all directions. Also, the front panel 61 defining the front surface of the transparent display assembly 60 may further extend outward from the plate opening 511 and then be stably fixed and mounted on the inner frame 52 due to characteristics of the transparent display assembly 60 mounted on at the rear side of the outer plate 51.

Thus, when the transparent display assembly 60 is mounted, each of the extending ends of the front panel 61, i.e., the front protrusion 613 may be supported by the inner frame 52, and thus, the transparent display assembly 60 may be stably maintained in the mounted state without being separated.

A bezel 611 may be disposed on a circumference of the rear surface of the front panel 61. The bezel 611 may be printed with a black color and have a predetermined width so that the outer spacer 67 and the first spacer 63 are covered without being exposed to the outside.

A touch sensor 612 may be disposed on an inner area of the bezel 611. The touch sensor 612 may be formed on the rear surface of the front panel 61 in a printing manner and be configured to detect user's touch manipulation of the front panel 61. Alternatively, the touch sensor 612 may be formed in various manners such as a film adhesion manner, rather than the printing manner, so that the user touches the front panel 61 to perform the touch input.

A touch cable 601 connected to the touch sensor 612 may be disposed on the upper end of the front panel 61. The touch cable 601 may be provided as a flexible film type cable such as a flexible flat cable (FFC) or a flexible print cable or flexible print circuit board (FPC). A printed circuit may be printed on the touch cable 601 to constitute at least a portion of a touch PCB 603. Also, the touch cable 601 may be connected to the touch PCB 603 that will be described below.

The display 62 may be disposed on the rear surface of the front panel 61. The display 62 may be provided as an LCD module for outputting a screen. Also, the display 62 may be transparent so that the user sees the inside through the display 62 when the screen is not outputted.

A source board 621 may be disposed on one end of both left and right sides of the display 62. The source board 621 may be configured to output a screen through the display 62 and provided as one assembly with the display 62. Also, a portion of the source board 621 may include the flexible film type cable structure and extend upward along a side surface of the transparent display assembly 60 in the bent state.

Also, the source board 621 may have a width less than a thickness of the transparent display assembly 60 and be bent while the transparent display assembly 60 is assembled. Here, a position at which the source board 621 is disposed may be defined between the inside of the outer spacer 67 and the first spacer 63 and come into contact with an inner surface of the outer spacer 67 in the bent state.

Also, the source board 621 may be connected to a display cable 605.

The display cable 605 may be connected to a T-CON board 623 at an upper portion of the sub door 50.

In detail, when the source board 621 is disposed on the rear surface of the display 62, the source board 621 may be exposed to the outside through the see-through part 21 due to the characteristics of the display 62 that is transparent. Also, when the source board 621 has a structure that protrudes laterally, the sub door 50 may increase in size.

Thus, the source board 621 may be disposed on an end of a circumferential side of the display 62 and bent to come into contact with the inner surface of the outer spacer 67 inside the outer spacer 67. Also, the source board 621 may have a size corresponding to that of the outer spacer 67 without getting out of a region of the outer spacer 67 in a state of being closely attached to the outer spacer 67.

The source board 621 may be constituted by two upper and lower boards 621 and respectively connected to the pair of display cables 605. The display cable 605 may have a flexible and flat structure like the touch cable 601 and also have a structure that is freely bendable.

The display cable 605 may extend along the circumferential surface of the transparent display assembly 60 and pass through a sealant 691 defining the side surface of the transparent display assembly 60 to extend to the outside of the transparent display assembly 60.

Also, the display cable 605 may be bent to extend along the circumferential surface of the transparent display assembly 60, i.e., be bent so that an end thereof extends upward from the transparent display assembly 60. Thus, the display cable 605 may be coupled to the T-CON board 602 at the upper side of the sub door 50.

Both ends of the display 62 may be supported by the first spacer 63. The first spacer 63 may have a rod or stick shape extending from an upper end to the lower end of the display 62 and be provided in a pair on both left and right sides to support both left and right ends of the display 62. The first spacer 63 may be made of an aluminum material and maintain a preset distance between the display 62 and the light guide plate 64.

The light guide plate 64 may be disposed at a rear side of the display, supported by the pair of first spacers 63 disposed at both left and right sides, and disposed to be spaced a predetermined distance from the display 62. There is a difference in depth feeling of the screen outputted from the display 62 according to the position of the light guide plate 64.

Thus, the light guide plate 64 may be disposed further forward than an intermediate point between the front panel 61 and the rear panel 65 so that the screen outputted by the display 62 is felt closer to the front panel 61. As a result, a height of the first spacer 63 may be determined.

The light guide plate 64 may diffuse or scatter light emitted from the display light 68 and be made of various materials. For example, the light guide plate 64 may be made of a polymer material or formed by forming a pattern or attaching a film on a surface thereof. The light guide plate 64 may illuminate the display 62 from the rear side of the display 62 when the display light 68 is turned on. For this, the light guide plate 64 may have a plate shape having a size equal to or somewhat greater than that of the display 62. The display light 68 may be disposed at a position corresponding to each of upper and lower ends of the light guide plate 64.

The rear panel 65 may be disposed at a rear side of the light guide plate 64. The rear panel 65 may define the rear surface of the transparent display assembly 60 and have a size greater than that of the light guide plate and less than that of the front panel 61. Also, the rear panel 65 may have a size greater than that of the linear opening 561 to cover the linear opening 561.

A circumference of the rear panel 65 may further protrude outward from the outer spacer 67 to provide a rear panel protrusion 651. The rear panel protrusion 651 may be seated on the door liner 56 when the transparent display assembly 60 is mounted and provide a space in which a foaming solution is filled when the insulation material 531 is molded in the sub door 50.

The insulation coating layer 652 for the thermal insulation may be disposed on the surface of the glass layer 651 to thermally insulate the rear panel 65. The insulation coating layer 652 may transmit visible light to allow user to see the inside of the refrigerator and reflect the radiant heat irradiated to the rear panel 65 to block heat transfer.

The insulation coating layer 652 may be disposed on the front surface of the rear panel 65, i.e., a surface facing the light guide plate 64. The insulation coating layer 652 may be manufactured through metal oxide coating or attachment of a film made of tin oxide ($SnO_2$) by using a chemical vapor deposition (CVD) process using tin oxide ($SnO_2$). The insulation coating layer 652 may be disposed on at least one surface of the rear panel 65, and if necessary, disposed on both side surfaces of the rear panel 65.

As described above, since the insulation coating layer 652 is disposed on the rear panel 54, the rear panel 65 may prevent cool air within the refrigerator 1 from being transferred to the outside through the transparent display assembly 60, thereby more effectively insulating the inside of the refrigerator 1 from the outside of the refrigerator 1.

Also, the same panel as the rear panel 65 may be further disposed between the light guide plate 64 and the rear panel 65, and thus, a multilayered insulation coating layer 652 may be provided. As described above, when the plurality of insulation coating layers 652 are provided, the thermal insulation performance may be more improved. Although the plurality of panels equal to the rear panel disposed on the insulation coating layer are provided to improve the thermal insulation performance, the adequate number of panels may be provided within limits capable of maintaining the total thickness of the sub door 50.

The insulation coating layer 652 may not be provided on the light guide plate 64 and the front panel 61 except for the rear panel 65. When the insulation coating layer 652 is disposed on the light guide plate 64, the insulation coating layer 652 may affect illumination of uniform light to the display 62. When the insulation coating layer 652 is disposed on the front panel 61, malfunction of the touch sensor 612 may occur.

Particularly, the touch sensor 612 for detecting the touch manipulation of the user in the electrostatic capacity manner may be attached to the front panel 61. Thus, when the metal oxide made of tin oxide ($SnO_2$) is disposed on the front panel 61, the touch sensor 612 may not accurately detect a variation in electrostatic capacity, and thus, the malfunction in touch manipulation may occur.

Thus, the insulation coating layer 652 may not be disposed on the front panel 61, but disposed on only the rear panel 65 except for the front panel 61 and the light guide plate 64 to black heat transfer through the transparent display assembly 60.

A second spacer 66 may be disposed between the rear panel 65 and the light guide plate 64. The second spacer 66 may have a rectangular frame shape disposed along a circumference of the light guide plate 64 and adhere to the light guide plate 64 and the rear panel 64 to maintain a predetermined distance between the light guide plate 64 and the rear panel 65.

Although the spacers 63, 66, and 67 have structures different from each other in this embodiment, the spacers 63, 66, and 67 may maintain a distance between the adjacent panels 61 and 65 and the light guide plate 64 and have various shapes such as a shape in which the moisture absorbent is accommodated into a shape such as a rod.

The distance between the front panel 61 and the light guide plate 64 may be maintained in fixed distance so as to output the screen of the display 62. Also, the distance between the light guide plate 64 and the rear panel 65 may be determined according to a thickness of the sub door 50 or the total thickness of the transparent display assembly 60. That is, the second spacer 66 may be adjusted in thickness to determine the total thickness of the transparent display assembly 60 so as to be mounted to match a specification of the sub door 50.

The second spacer 66 may be made of an aluminum material, and a moisture absorbent 661 may be filled into the second spacer 66. Also, a plurality of punched holes 662 may be defined in an inner surface of the second spacer 66. Thus, moisture in the space between the rear panel 65 and the light guide plate 64 may be absorbed by the moisture absorbent 661 so that the space is maintained in dry condition. Thus, an occurrence of dew condensation or blurring of the inside due to moisture may be prevented.

The second spacer 66 may adhere to the light guide plate 64 and the rear panel 65 by using an adhesion member 663. Thus, a sealed close space may be provided between the light guide plate 64 and the rear panel 65. Also, an argon gas may be filled between the light guide plate 64 and the rear panel 65, which are sealed by the second spacer 66, to provide a first insulation layer 691.

The argon gas is a mono-atomic inert gas having a weight greater than that of air, and thus, convection does not likely occur. Thus, when the argon gas is filled into the first insulation layer 691, the heat transfer due to the convection may not occur between the light guide plate 64 and the rear panel 65, and thus, the overall thermal insulation performance of the transparent display assembly 60 may be improved. In addition, an inert gas having the thermal insulation performance except for the argon gas may be filled into the first insulation layer 691.

The rear panel 65 may come into contact with the door light 57. Thus, a distance between the display 62 and the door light 57 may be determined according to the position of the rear panel 65. The door light 57 may serve as an auxiliary backlight of the display 62 in the turn-on state.

In detail, a distance between the display 62 and the door light 58 may range from about 5 cm to about 15 cm. When the distance between the display 62 and the door light 57 is less than about 5 cm, a shade may occur. When the distance between the display 62 and the door light 57 exceeds about 5 cm, the door light may not serve as the backlight. Thus, to maintain the distance between the display 62 and the door light 57, the rear panel 65 may also be maintained to be spaced a predetermined distance from the display 62, and thus, the width of the second spacer 66 may be determined.

A gap between the light guide plate 64 and the rear panel 65 may be sealed by the second spacer 66. Thus, a space between the second spacer 66 and the light guide plate 64 may become to a vacuum state, or an insulative gas such as argon may be injected for the thermal insulation to more improve the thermal insulation performance.

In the state in which the rear panel 65 adheres to the second spacer 66, an outer end of the rear panel 65 may further extend outward from the second spacer 66. Also, the outer spacer 67 may be mounted on the rear panel 65 so that the rear panel 65 and the front panel 61 are fixed to each other.

The outer spacer 67 may connect the rear surface of the front panel 61 to the front surface of the rear panel 65 and also define the circumferential surface of the transparent display assembly 60. Also, a space in which the display light 68 is mounted may be provided in an inner surface of the outer spacer 67.

The outer spacer 67 may have a rectangular frame shape. Also, the outer spacer 67 may have a size in which the light guide plate 64 and the first and second spacers 63 and 66 are accommodated.

The first spacer 63 disposed inside the outer spacer 67 may have upper and lower ends, which come into contact with the outer spacer 67, but may not be completely sealed due to the simple contact structure thereof. Thus, a space between the front panel 61 and the rear panel 65, which is spaced by the first spacer 63, may not have a sealed structure.

However, the outer spacer 67 may be disposed between the front panel 61 and the rear panel 65 to seal the space between the front panel 61 and the rear panel 65. Although the first spacer 63 does not seal the space between the front panel 61 and the light guide plate 64 inside the outer spacer 67, the space between the front panel 64 and the rear panel 65 inside the outer spacer 67 in addition to the space between the front panel 61 and the light guide plate 64, in which the first spacer 63 is accommodated therebetween, may be sealed by the outer spacer 67. Thus, the argon gas may be filled into the space between the front panel 61 and the light guide plate 64, and a second insulation layer may be provided to more improve the thermal insulation performance of the transparent display assembly 60.

In detail, the outer spacer 67 may define a circumference of an outer portion of the transparent display assembly 60 and also have a connection structure that is capable of allowing the front panel 61 to be maintained at a certain distance.

The space between the front panel 61 and the rear panel 65, i.e., the inner space of the outer spacer may be completely sealed by the coupling of the outer spacer 67. Also, the inside of the outer spacer 67 may be more sealed by the sealant 691 applied to the circumference of the outer spacer 67.

The display 62 and the light guide plate 64 may be spaced apart from each other in a front and rear direction within the inside of the space that is sealed by the outer spacer 67. The first and second spacers 63 and 66 for maintaining the distance of the light guide plate 64 may be also provided in the inner space of the outer spacer 67.

An additional insulation panel may be further provided in the outer spacer 67, or a multilayered glass structure may be provided in the outer spacer 67. All of the above-described constituents may be provided in the space defined by the outer spacer 67.

That is, the overall outer appearance of the transparent display assembly 60 may be defined by the front panel 61, the rear panel 65, and the outer spacer 67, and all of the remaining constituents may be provided in the outer spacer 67. Thus, the sealing may be performed only between the outer spacer 67, the front panel 61, and the rear panel 65 to completely seal the multilayered panel structure.

Particularly, even through a plate-shaped structure such as the light guide plate 64 is further provided in the outer spacer 67, when only the outer spacer 67 adheres to the front panel 61 and the rear panel 65, the sealed structure of the transparent display assembly 60 may be achieved. The sealed structure may maintain a minimal sealing point even in the multilayered structure due to the plurality of panel including the light guide plate 64.

Thus, introduction of external air into the transparent display assembly 60 or the dew condensation in the transparent display assembly 60 due to introduction of moisture may be minimized. Also, when the inside of the outer spacer 67 becomes in a vacuum state, or a gas for the thermal insulation is injected, the insulation layer may be provided in the whole multilayered structure within the transparent display assembly 60 to more improve the thermal insulation performance.

The transparent display assembly 60 may be disposed in the sub door 50 so that the inside of the refrigerator is seen, and the screen is outputted, and also, the thermal insulation structure may be achieved in the multilayered panel structure at the minimum sealing point to secure the thermal insulation performance.

Also, the display light 68 may be mounted on each of the upper and lower ends of the outer spacer 67. The light guide plate 64 may be disposed between the display lights 68 disposed on the upper and lower ends of the outer spacer 67.

Thus, light emitted through the display light 68 may be directed to an end of the light guide plate 64 and then travel along the light guide plate 64 so that the entire surface of the light guide plate 64 emits light.

The display lights 68 disposed on the inner upper and lower ends of the transparent display assembly 60 may be connected to a display light cable 606. The display light cable 606 may have a flexible and flat shape like the touch cable 601 and the display cable 605.

The display light cable 606 may be connected to the display light 68 that is mounted inside the outer spacer 67 to extend to the outside of the transparent display assembly 60 through the sealant 691.

Also, the display light cable 606 may extend along the circumference of the transparent display 62 so that the display light cable 606 is not exposed through the transparent display 62. Also, the display light cable 606 may extend upward in a state of being closely attached to the rear surface of the rear panel 65. As occasion demands, the display light cable 606 may be bent in the state of adhering to the rear surface of the rear panel 65 and then may be connected to a docking PCB 604 disposed on the upper portion of the sub door 50.

Here, since the display light cable 606 extends in the state of being closely attached to the circumference of the rear panel 65, when the sub door 50 is viewed from the outside, the display light cable 606 may be covered by the bezel 611 and thus may not be exposed through the transparent display assembly 60.

The sealant 691 may be applied to the circumference of the outer spacer 67. The sealant 691 may be applied to form the circumferential surface of the transparent display assembly 60. That is, the sealant 691 may completely seal a circumferential surface between the front panel 61 and the rear panel 65.

The sealant 691 may seal the transparent display assembly 60 to prevent air from being introduced into the transparent display assembly 60 and be made of a polysulfide (that is called a thiokol) material. As occasion demands, the sealant 691 may be made of a different sealant material such as silicon or urethane so that the sealant 691 comes into direct contact with the foaming solution that is injected to mold the insulation material 531.

The sealant 691 may maintain the coupling of the outer spacer 67, the front panel 61, and the rear panel 65 and completely seal the connected portions of the components to prevent water or moisture from being introduced. Also, the sealant 691 may be a portion, which comes into directly contact with the foaming solution when the insulation material 531 is molded, and protect the circumference of the transparent display assembly 60.

Also, the sealant 691 may allow cables 601, 605, and 606 connected to the touch sensor 612, the display panel 62, and the display light 68 within the transparent display assembly 60 to be accessible therethrough. The sealant 691 may cover outer surfaces of the cables 601, 605, and 606 to prevent water or moisture from being introduced through spaces through which the cables 601, 605, and 606 are accessible when the cables 601, 605, and 606 extend through the circumferential surface of the transparent display assembly 60.

Thus, the inside of the outer spacer 67 may be completely sealed by the sealant 670, and the argon gas for the thermal insulation injected into the outer spacer 67 may be prevented from leaking.

Figure 12:
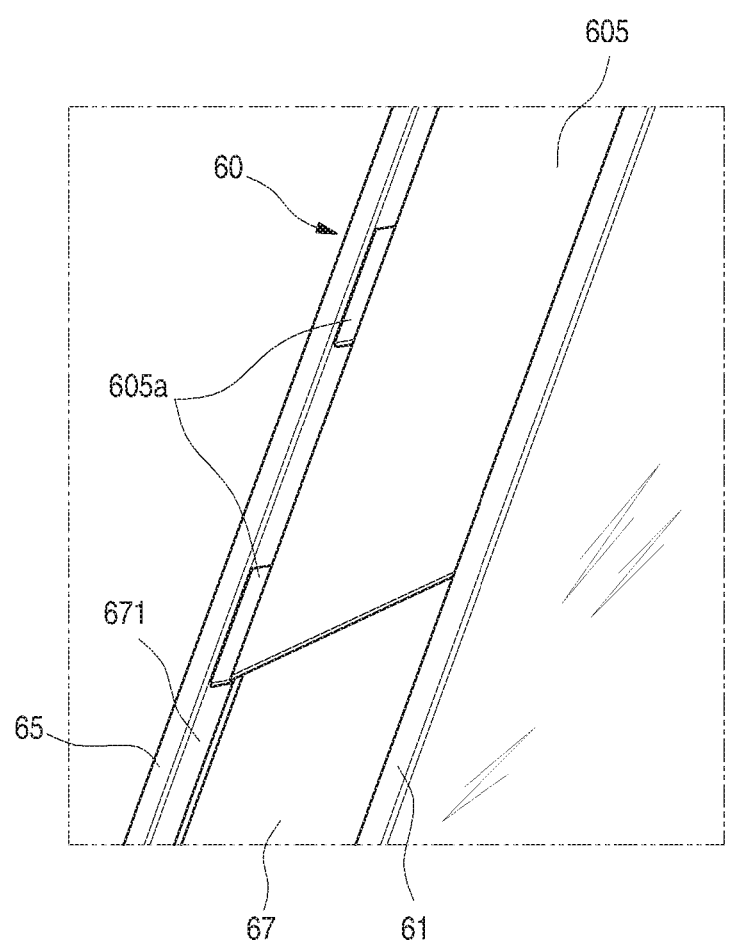
FIG. 12 is a partial perspective view illustrating a structure in which a display cable is disposed on the transparent display assembly.
Figure 13:
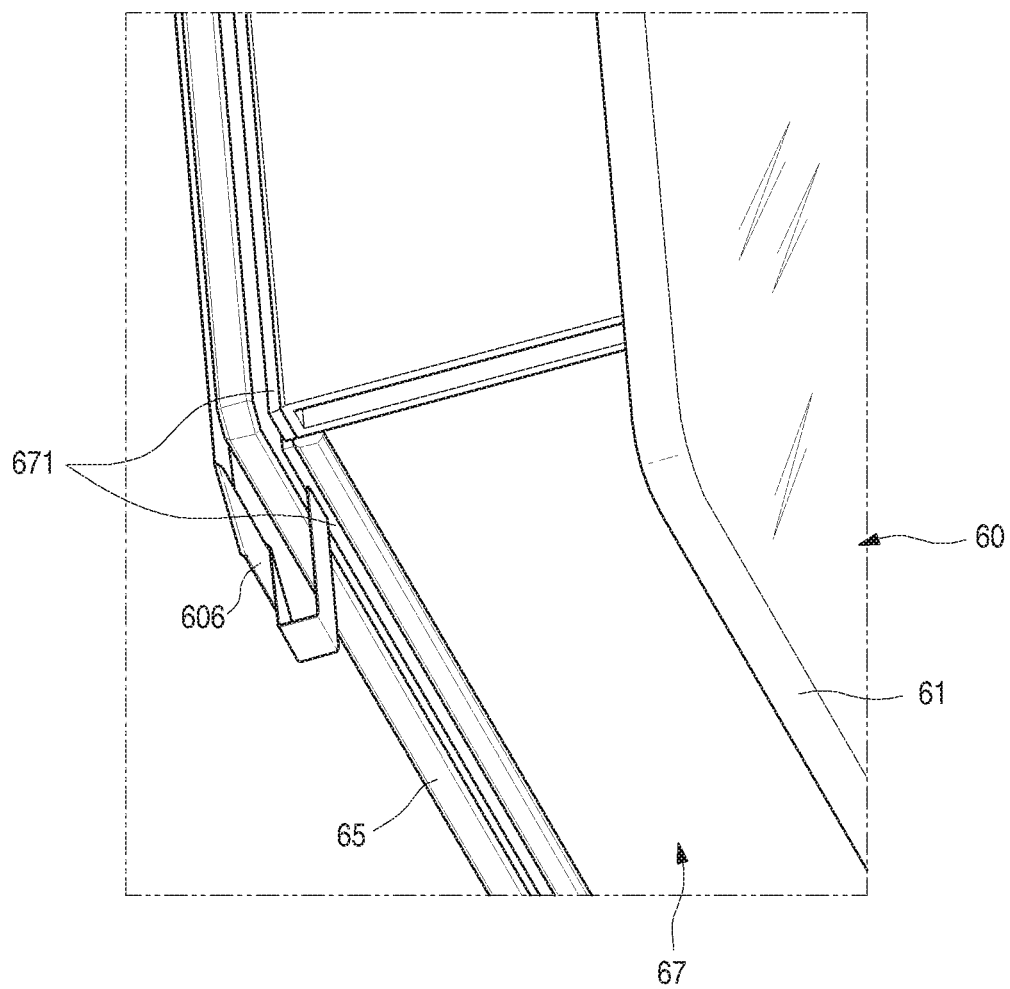
FIG. 13 is a partial perspective view illustrating a structure in which a display light is disposed on the transparent display assembly.

FIG. 11 is a partial perspective view illustrating a state in which the PCB is disposed on the upper portion of the transparent display assembly. Also, FIG. 12 is a partial perspective view illustrating a structure in which the display cable is disposed on the transparent display assembly. FIG. 13 is a partial perspective view illustrating a structure in which the display light is disposed on the transparent display assembly.

As illustrated in the drawings, a plurality of PCBs 602, 603, and 604 for driving the transparent display assembly 60 may be disposed on an upper side of the sub door 50, i.e., a space between an upper end of the transparent display assembly 60 and the upper cap deco.

The PCBs mounted on the PCB mounting part 545 may include the T-CON board 602, the touch PCB 603, and the docking PCB 604. The T-CON board 602 may include a display cable 605 for driving the display 62. The touch PCB 603 may process a touch input signal of the touch sensor 612 and include a touch cable 601 connected to the touch sensor 612. The docking PCB 604 may connect the touch PCB 603 and/or the T-CON board 602, and the control unit 14 on the cabinet 10 to the wire type connection cable 607.

The cables 601, 605, and 606 connecting the plurality of cables 602, 603, and 604 to each other may be provided as the flexible film type FFC or FPC. Thus, the touch cable 601, the display cable 605, and the display light cable 606 may occupy a large space within the sub door 50 and be disposed to be closely attached to each other along the outside of the transparent display assembly 60. Also, the connection structure with the PCBs 602, 603, and 604 may also be simply provided and may not be exposed to the outside through the see-through part 21. In addition, when the insulation material 531 is foamed to be molded in the sub door 50, the PCBs 602, 603, and 604 may not interfere with the insulation material 531.

In more detail, as illustrated in FIG. 11, the touch cable 601 may extend upward from an upper end of the touch sensor 612 and be connected to the touch PCB 603 disposed at an upper side thereof. The touch cable 601 may have a flat shape, and the extending end of the touch cable 601 may be bent to be connected to the touch PCB 603.

The display cable 605 may be connected to the source board 621 to extend upward. Then, the display cable 605 may extend along the circumference of the side surface of the transparent display assembly 60 and then be connected to the T-CON board 602.

The display cable 605 may be connected to the source board 621 inside the transparent display assembly 60. As illustrated in FIG. 12, the display cable 605 may be guided to the outside of the outer spacer 67 through the space between the rear panel 65 and the outer spacer 67.

In detail, a cable connection part 605a is provided on the display cable 605. The cable connection part 605a may be introduced into the transparent display assembly 60 through the space defined by the rear panel 65 and the end of the outer spacer 67 and then be connected to the source board 621 in the inner space of the transparent display 62.

A double-sided tape or an adhesion member 671 such as an adhesive, which adheres to the rear panel 65, may be disposed on an end of the outer spacer 67. The cable connection part 605a may pass through the adhesion member 671 and be guided to the outside of the outer spacer 67.

Also, a sealant 670 may be applied to an outer surface of the outer spacer 67 to cover a circumference of the cable connection part 605a, thereby preventing the argon gas from leaking to the outside through the cable connection part 605a and preventing moisture from being introduced.

Also, the display cable 605 may be bent at the outside of the outer spacer 67 to extend upward along the circumference of the outer spacer 67 coated with the sealant 670 and then be connected to the T-CON board 602.

The display light cable 606 may be connected to the display light 68 disposed on each of the upper and lower portions of the transparent display assembly 60 to extend upward along the outer circumference of the transparent display assembly 60 and then be connected to the docking PCB 604.

In detail, as illustrated in FIG. 12, the display light cable 606 may be introduced into the transparent display assembly 60 through the space between the rear panel 65 and the outer spacer 67 and then be connected to the display light 68 disposed inside the outer spacer 67.

The display light cable 606 may pass through the adhesion member 671 for allowing the outer spacer 67 and the rear panel 65 to adhere to each other and then be exposed to the outside. Then, the display light cable 606 may be bent to face the docking PCB 604 and extend along a circumference of the rear panel 65.

The docking PCB 604 may be connected to an end of the door light cable 609 that extends from the door light 57. The door light 57 may be provided as a separate part with respect to the transparent display assembly 60 and mounted on the door liner 56.

The docking PCB 604 may be connected to at least one of the touch PCB 603 and the T-CON board 602 and also be connected to the control unit 14 via the sub door 50 by the wire type connection cable 607.

Thus, the plurality of flat cables 601, 605, and 606 may be connected to the docking PCB 604, and the less number of connection cables 607 connected to the docking PCB 604 may be guided to the outside of the sub door 50 and then be connected to the control unit 14. Thus, the control unit 14 and the electric components of the transparent display assembly 60 may communicate with each other by the connection cable 607 and the cables 601, 605, and 606 to transmit information for operation.

The transparent display assembly 60 has an insulation structure to prevent heat transfer between the inside of the refrigerator and the outside from occurring. Hereinafter, this structure will be described in more detail with reference to the accompanying drawings.

Figure 14:
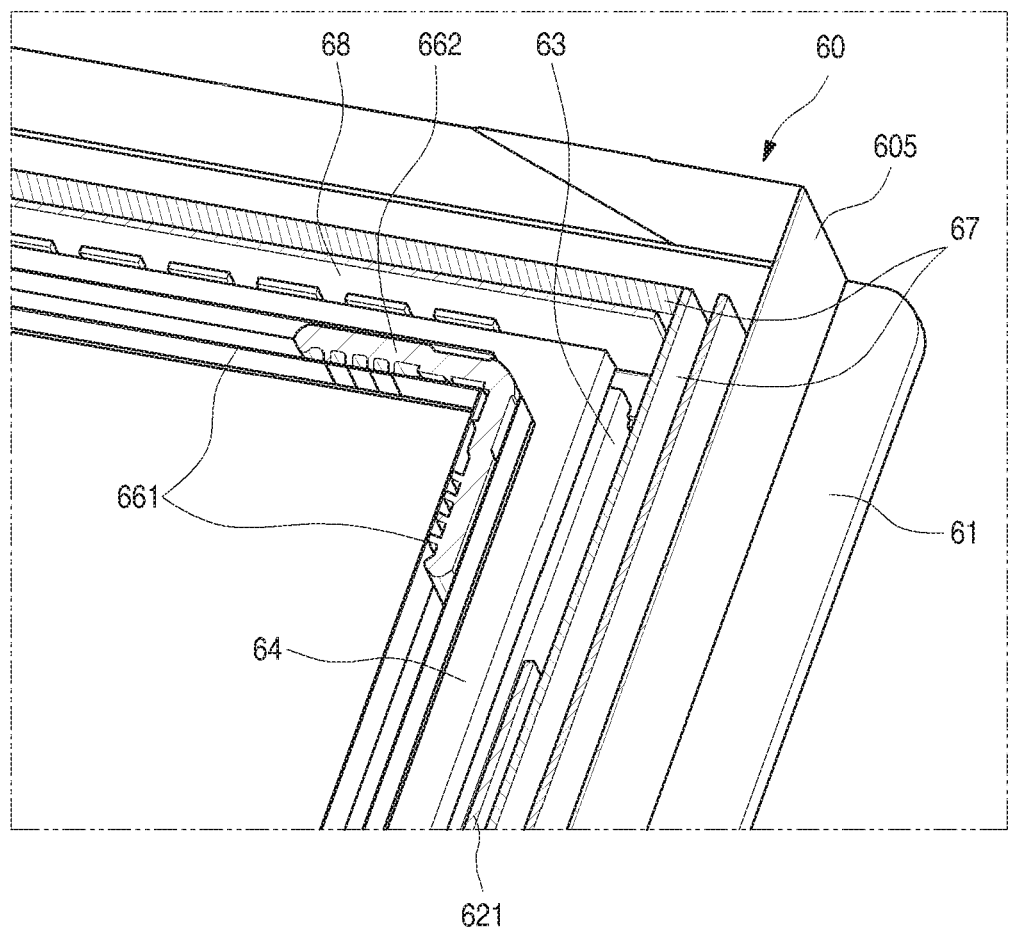
FIG. 14 is a partial cutaway perspective view of the transparent display assembly.
Figure 15:
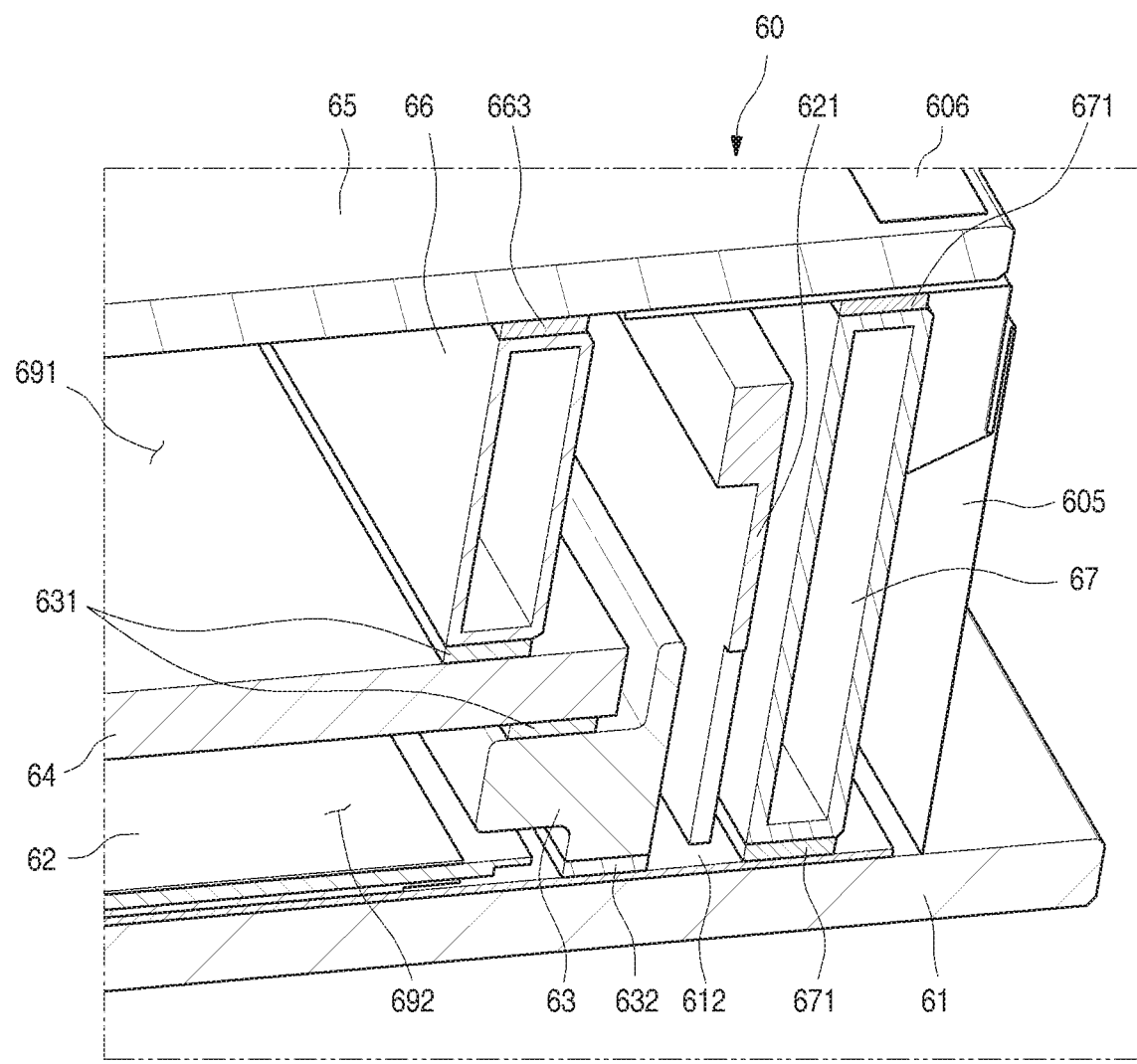
FIG. 15 is a cross-sectional view taken along line 15-15' of FIG. 8.
Figure 16:
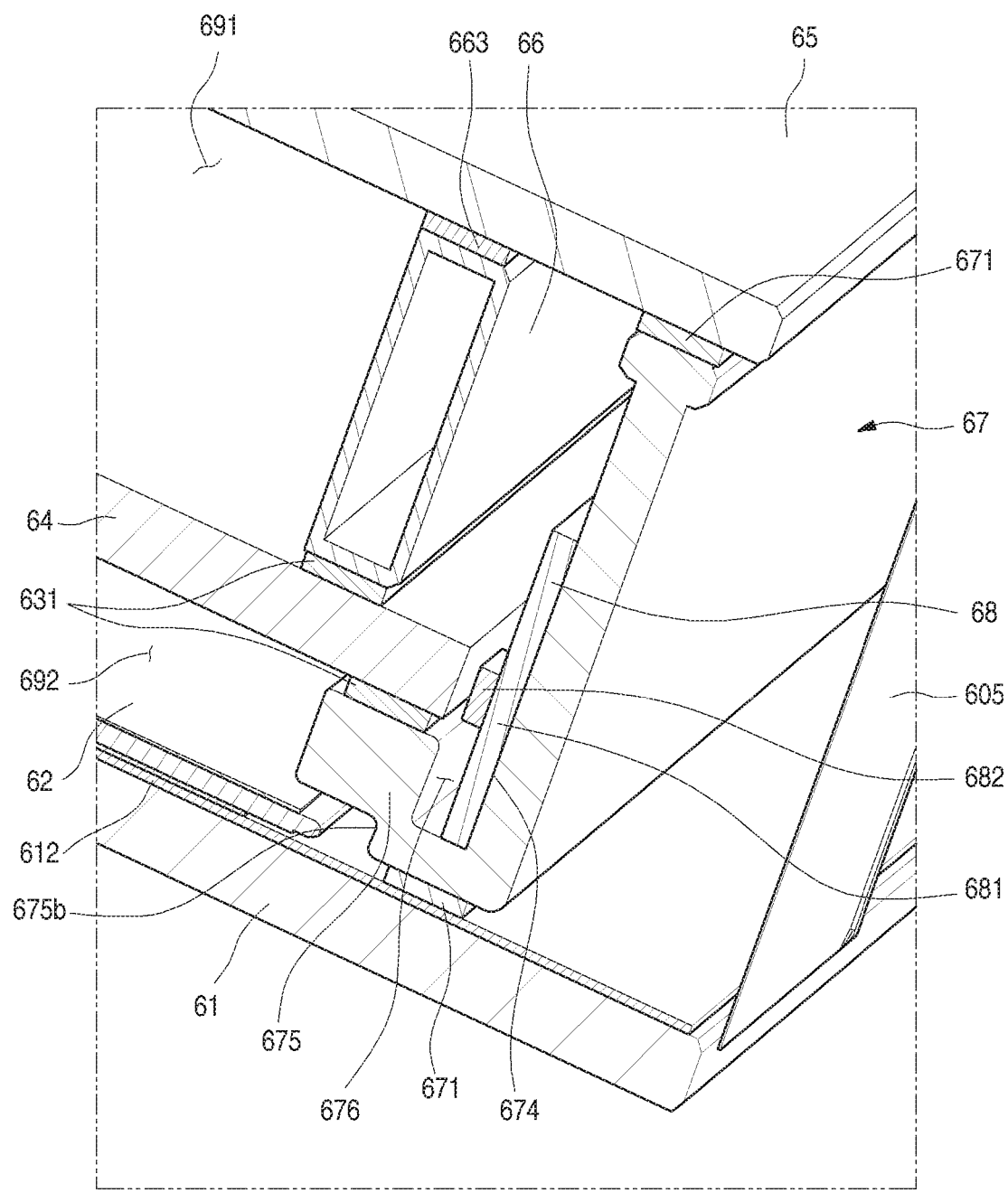
FIG. 16 is a cross-sectional view taken along line 16-16' of FIG. 8.

FIG. 14 is a partial cutaway perspective view of the transparent display assembly. Also, FIG. 15 is a cross-sectional view taken along line 15-15' of FIG. 8. Also, FIG. 16 is a cross-sectional view taken along line 16-16' of FIG. 8.

As illustrated in the drawings, the transparent display assembly 60 includes a first insulation layer 691 sealed between the rear panel 65 and the light guide plate 64 by the second spacer 66 and a second insulation layer 692 between the rear panel 65 and the front panel 61 by the outer spacer 67.

In detail, the outer spacer 67 may be disposed on the rear surface of the front panel 61, which has the largest area, and the display 62, the first spacer 63, the light guide plate 64, and the second spacer 66 may be sequentially disposed inside the outer spacer 67. Also, the rear panel 65 may adhere to the rear surface of the outer spacer 67 to define an outer appearance of the transparent display assembly 60.

The touch sensor 612 is disposed on the rear surface of the front panel 61, and the display 62 is disposed on a rear surface of the touch sensor 612. The display 62 may be disposed in an inner region of the outer spacer 67, and the light guide plate 64 may be disposed at a position that is spaced a predetermined distance from the display 62 by the first spacer 63.

The first spacer 63 may be disposed on each of both left and right sides of the display 62 to adhere the rear surface of the front panel 61 by the adhesion member 632. Also, both ends of the light guide plate 64 may be supported by a support pad 631 disposed on the rear surface of the first spacer 63. Also, the upper and lower ends of the light guide plate 64, which are not supported by the first spacer 63, may be supported by a light guide plate support part 675 extending from the outer spacer 67. In addition, the support pad 631 may adhere to the light guide plate support part 675 to support the upper and lower ends of the light guide plate 64. That is, the first spacer 63 and the light guide plate support part 675 may be disposed at the same height to support both left and right ends and upper and lower ends of the front surface of the light guide plate 64.

Here, since the light guide plate 64 may be contracted by heat due to the operation of the display light 68, the end of the circumference of the light guide plate 64 may not be completely fixed, and ends of the first spacer 63 and the light guide plate support part 675 may be disposed adjacent to each other without being fixed and coupled to each other. Due to this structure, the first spacer 63 may not be completely sealed, and air or a gas may flow between the inside and the outside of the first spacer 63.

Also, in a state in which the light guide plate 64 is supported by the first spacer 63 and the light guide plate support part 675, the display light 68 may be disposed at positions corresponding to the upper and lower ends of the light guide plate 64. The display light 68 may be configured so that a plurality of LEDs 682 are disposed on the substrate 681. Here, the LEDs 682 may be continuously disposed along the end of the light guide plate 64.

Here, the outer spacer 67 may include a display light mounting part 674 so that the LEDs 682 are disposed on the end of the light guide plate 64. A substrate accommodation part 676 into which the substrate 681 is inserted may be recessed to be defined in a portion at which the display light mounting part 674 and the light guide plate support part 675 are connected to each other. Thus, the LEDs 682 may emit light to the end of the light guide plate 64 at a position corresponding to the end of the light guide plate 64.

The first spacer 63, the second spacer 66, and the light guide plate 64 may be spaced apart from the inner surface of the outer spacer 67 to define a space therebetween. Thus, the source board 621 may be disposed inside the outer spacer 67. That is, the source board 621 may be disposed in a space defined by the inside the outer spacer 67 and the first spacer 63 and also be disposed to extend in a direction perpendicularly crossing the front panel 61.

An end of the source board 621 may extend up to a position adjacent to the rear surface of the front panel 61, and one side of the source board 621 may be connected to the display 62 through a space between the front panel 61 and the first spacer 63.

Here, a space may be defined between the front panel 61 and the first spacer 63. In detail, a wire constituting a portion of the source board 621, which passes between the first spacer 63 and the front panel 61, may exist. Due to the uneven structure of the wire, the first spacer 63 and the front panel 61 may not be completely attached to each other, and thus, a gap may be generated therebetween. That is, a sealed space may not be provided in the space between the front panel 61 and the light guide plate 64, which is defined by the first spacer 63.

Also, the source board 621 disposed between the outer spacer 67 and the first spacer 63 may be connected to the display cable 605. The source board 621 may be connected to the T-CON board 602 by the display cable 605.

A second spacer 66 may be disposed on the rear surface of the light guide plate 64. The second spacer 66 may have both ends that are opened and have a hollow polygonal tube shape in section. Also, the second spacer 66 may be provided as tube members 661 that define upper/lower and left/right sides thereof. A corner connection member 662 defining an edge of the second spacer 66 may be coupled to an opened end of each of the tube members 661. The ends of the tube members 661 may be connected to cross each other by the corner connection member 662, thereby providing the second spacer 66.

The second spacer 66 may have one end that adheres to the rear panel 65 by the adhesion member 663. Also, the second spacer may have the other end that comes into contact with the light guide plate 64 by the support pad 631. Since electronic components are not disposed between the light guide plate 64 and the rear panel 65, the cables 605 and 606 are not accessed between the light guide plate 64 and the rear panel 65, and thus, a completely sealed space may be provided between the light guide plate 64 and the rear panel 65.

Thus, a first insulation layer 691 may be disposed in an inner region of the second spacer 66. An argon gas may be filled into the first insulation layer to prevent heat from being transferred to the outside.

The argon gas to be injected into the first insulation layer 691 may be injected through an injection hole 664 defined in the second spacer 66 in the state in which the rear panel 65 and the light guide plate 64 adhere to the second spacer 66. After the argon gas is injected, the rest components of the transparent display assembly 60 may be coupled to the second spacer 66 in the state in which the light guide plate 64 is seated on the second spacer 66.

Although a sealed space is not provided in the inner region of the first spacer 63, the inner space defined by the outer spacer 67 may be sealed. That is, a space between the front panel 61 and the rear panel 65, which adhere to the outer spacer 67, may be sealed to provide the second insulation layer 692, and the inner region of the first spacer 63 may also be provided in the second insulation layer 692.

Thus, when the argon gas is injected into the second insulation layer 692, the argon gas may be injected up to the inside of the first spacer 63 to which the flow of the gas and air is enabled. As a result, the second insulation layer 692 into which the argon gas is injected may be defined in the whole space including the space between the front panel 61 and the light guide plate 64. Thus, the transparent display assembly 60 may be more improved in thermal insulation.

The first insulation layer 691 and the second insulation layer 692 may communicate with each other. In this case, when the argon gas is injected into the outer spacer 67, the argon gas may be injected into all of the first and second insulation layers 691 and 692.

Figure 17:
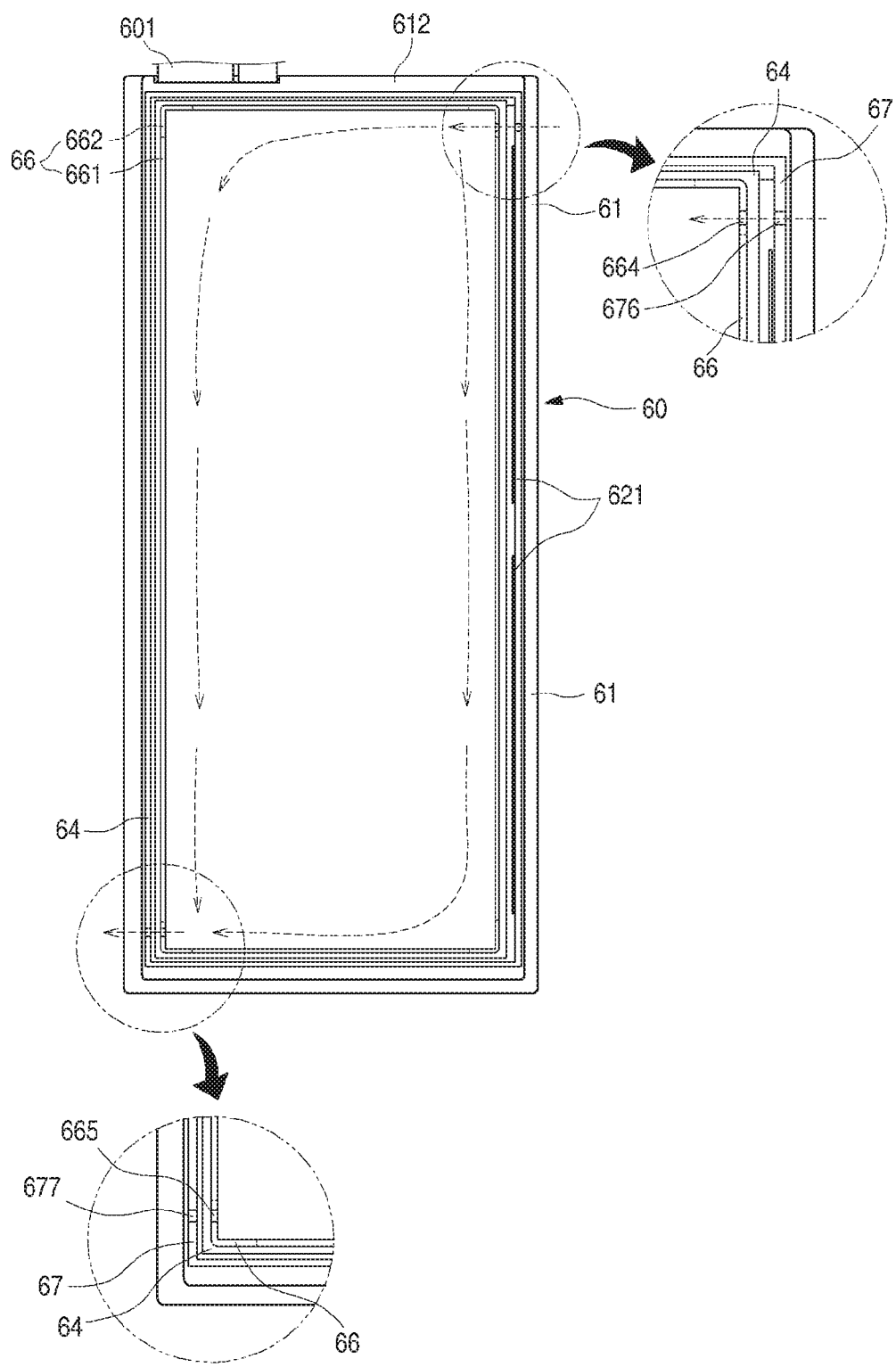
FIG. 17 is a rear view illustrating a state in which a rear panel of the transparent display assembly is removed.
Figure 18:
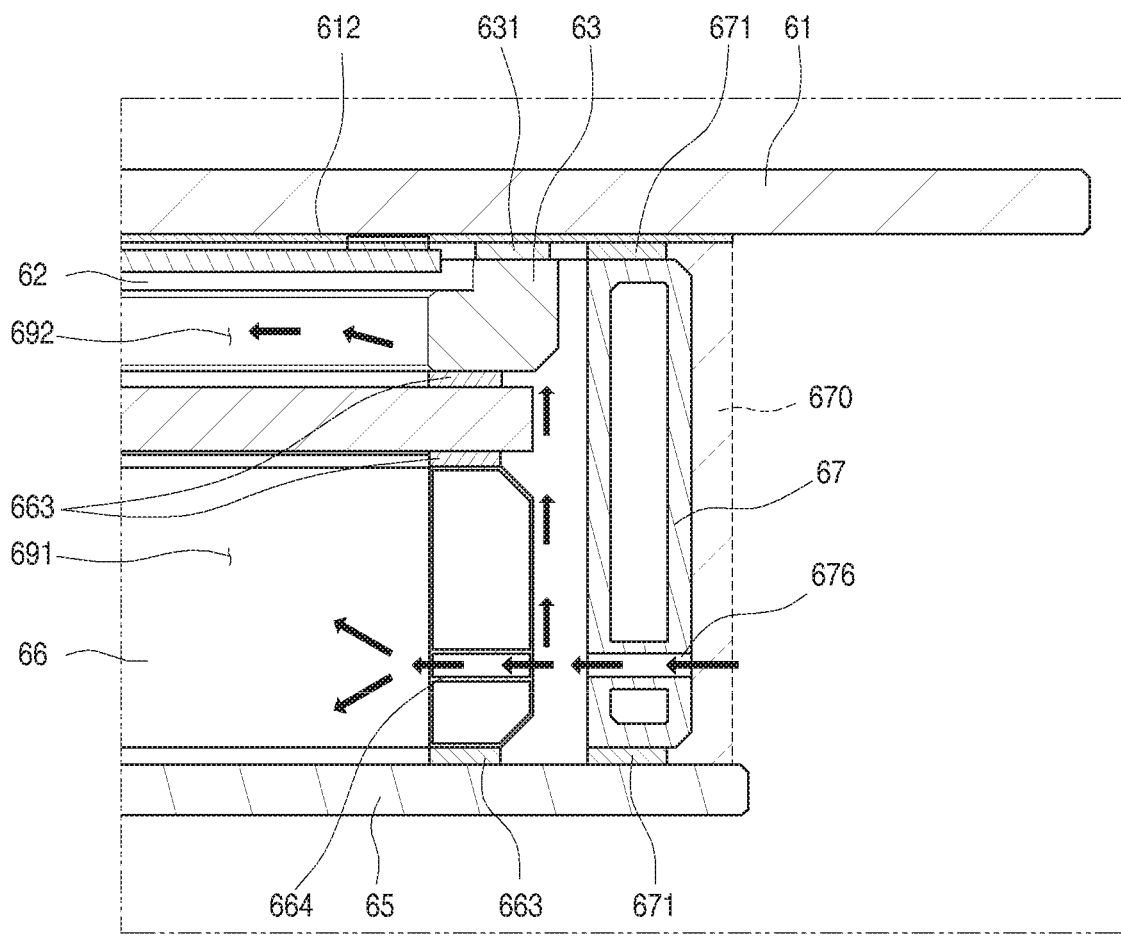
FIG. 18 is a view illustrating a state in which a gas is injected into the transparent display assembly.

FIG. 17 is a rear view illustrating a state in which the rear panel of the transparent display assembly is removed. Also, FIG. 18 is a view illustrating a state in which a gas is injected into the transparent display assembly.

As illustrated in the drawings, the transparent display assembly 60 may be disposed on the front and rear surfaces by the front panel 61 and the rear panel and have a circumferential surface defined by the outer spacer 67. Also, the display 62, the light guide plate 64, the first spacer 63, and the second spacer 66 may be disposed inside the outer spacer 67.

Also, to assemble the transparent display assembly 60, the touch sensor 612 and the display 62 may be sequentially disposed on the front panel 61, and the outer spacer 67 and the first spacer 63 may adhere to the front panel 61 by using the adhesion member 632. The display 62 may be fixed by the first spacer 63, and the light guide plate 64 may be seated on the rear surface of the first spacer 63 and the outer spacer 67. In this state, the second spacer 66 may support the rear surface of the light guide plate 64, and finally, the rear panel 65 may adhere to the second spacer 66 and the outer spacer 67 by using the adhesion members 663 and 671.

The touch cable 601 connected to an upper end of the touch sensor 612 extends upward. Also, the display cable 605 connected to the source board 621 may be guided to the outside through the gap between the outer spacer 67 and the rear panel 65. Also, the display light cable 606 connected to the display light 68 may also be guided to the outside through the gap between the outer spacer 67 and the rear panel 65. Here, each of the touch cable 601, the display cable 605, and the display light cable 606 may have a flat film shape and thus be easily guided to the outside through the gap between the rear panel 65 and the outer spacer 67.

Also, in the state in which the transparent display assembly 60 is assembled, the argon gas may be injected through injection holes 664 and 676, which are defined in a right upper end (when viewed in FIG. 17) of the outer spacer 67 and the second spacer 66. Also, when the gas is injected, air in the first and second insulation layers 691 and 692 may be discharged through discharge holes 665 and 677, which are defined in a left lower end (when viewed in FIG. 17) of the outer spacer 67 and the second spacer 66. Thus, the first and second insulation layers 691 and 692 may be completely filled. Also, to improve efficiency in injection of the gas, the injection holes 664 and 676 and the discharge holes 665 and 677 may be provided in plurality.

The argon gas may be injected to provide the insulation space in all of the first and second injection layers 691 and 692. In detail, the argon gas injected into the transparent display assembly 60 through the injection hole 664 may be filled into the space between the front panel 61 and the light guide plate 64 through the edge of the first spacer 63, i.e., the end of the first spacer 63 and the light guide plate support part 675 inside the outer spacer 67.

The argon gas may be filled into the whole inner space of the outer spacer 67. Here, the argon gas may also be injected into the second spacer 66 through the injection hole 664 defined in the second spacer 66. Thus, the argon gas may be filled up to the light guide plate 64 and the rear panel 65. As a result, the argon gas may be filled into all of the first and second insulation layers 691 and 692. Thus, the transparent display assembly 60 may be improved in whole insulation effect.

After the argon gas is injected into the transparent display assembly 60, the sealant 670 is applied to the circumference of the outer spacer 67. The sealant 670 may cover the injection hole 676 defined in the transparent display assembly 60 and also cover the portions through which the touch cable 601, the display cable 605, and the display light cable 606, which are guided to the outside through the circumference of the transparent display assembly 60, pass. Thus, the leakage of the gas into the transparent display assembly 60 and the introduction of the water and moisture into the transparent display assembly 60 may be prevented.

Hereinafter, turn-on/off states of the display light and the door light will be described in more detail with reference to the accompanying drawings.

Figure 19:
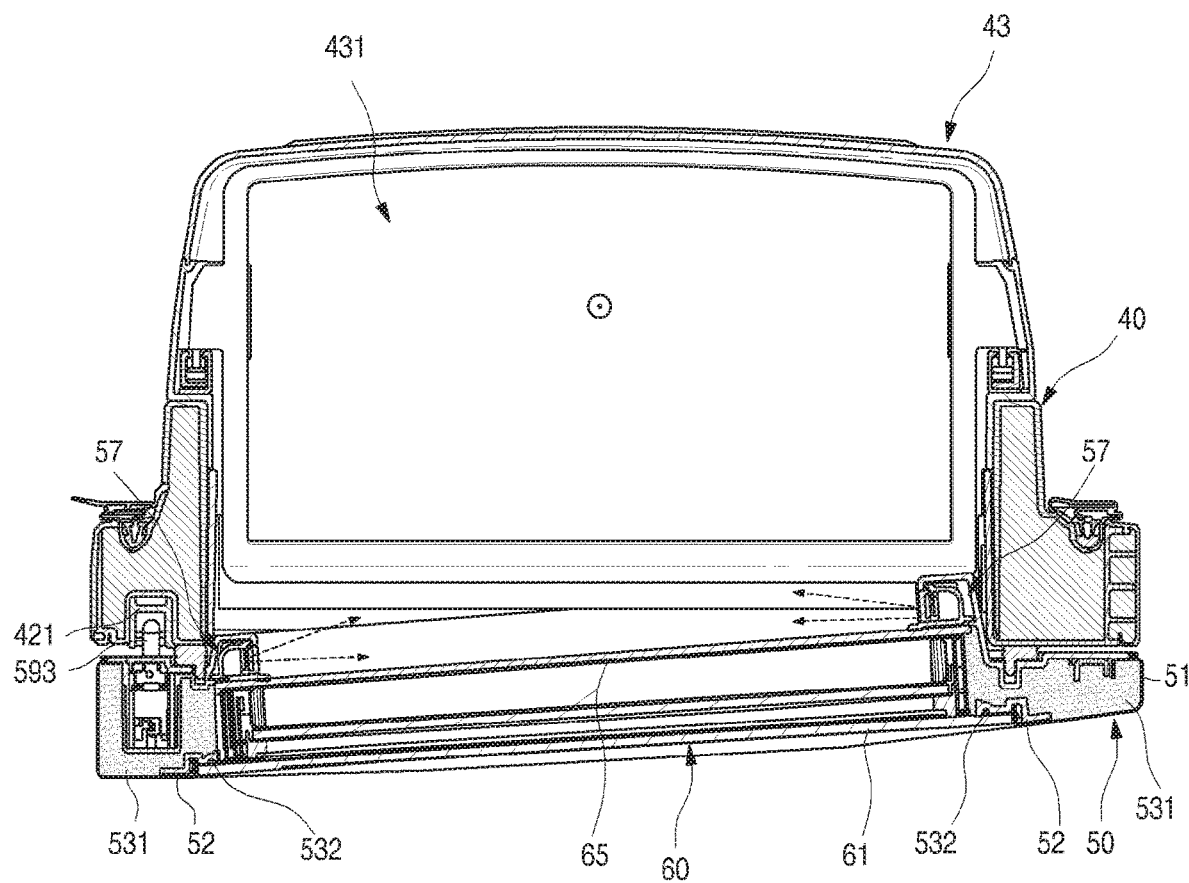
FIG. 19 is a transverse cross-sectional view of the main door and the sub door.
Figure 20:
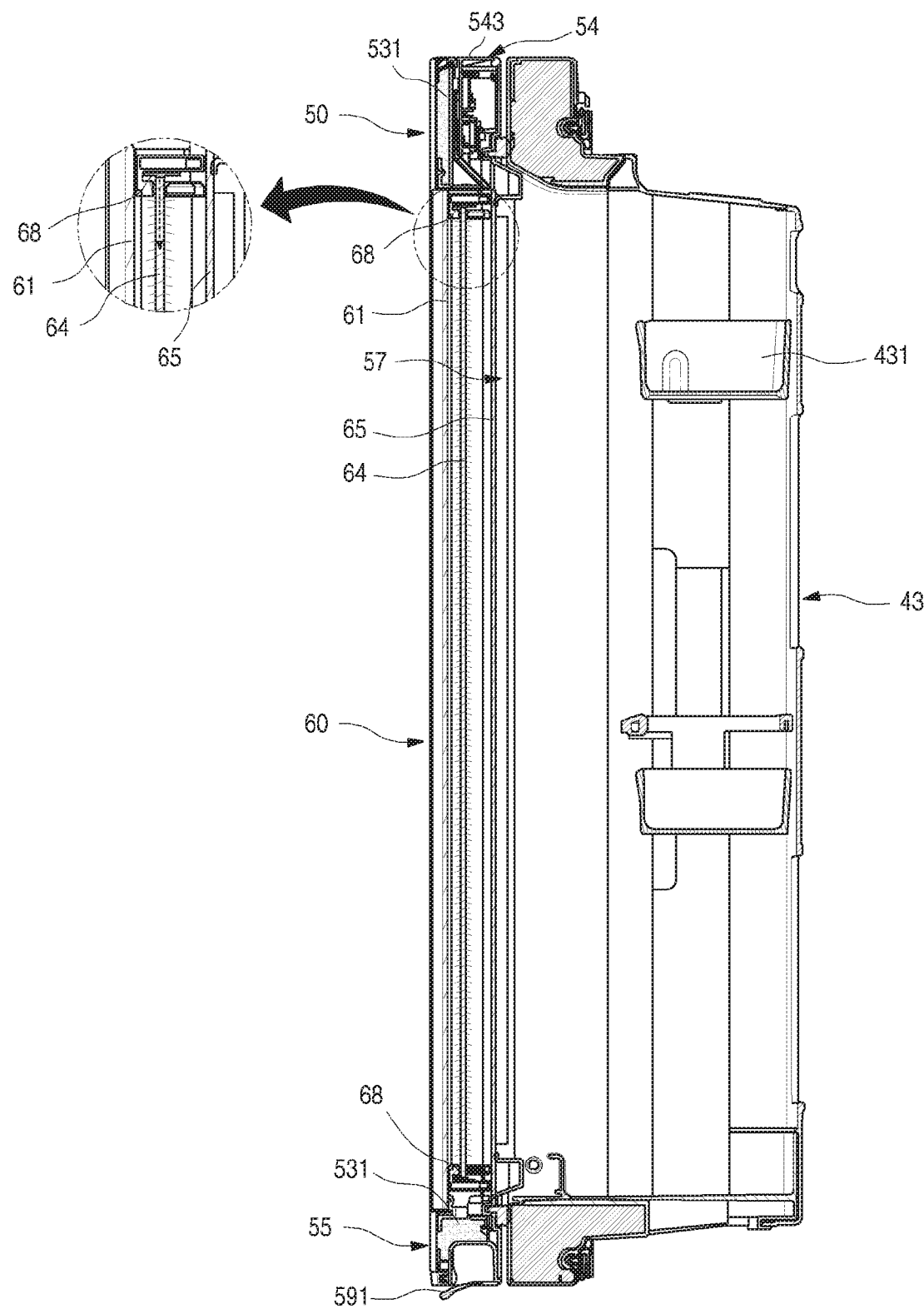
FIG. 20 is a longitudinal cross-sectional view of the main door and the sub door.
Figure 21:
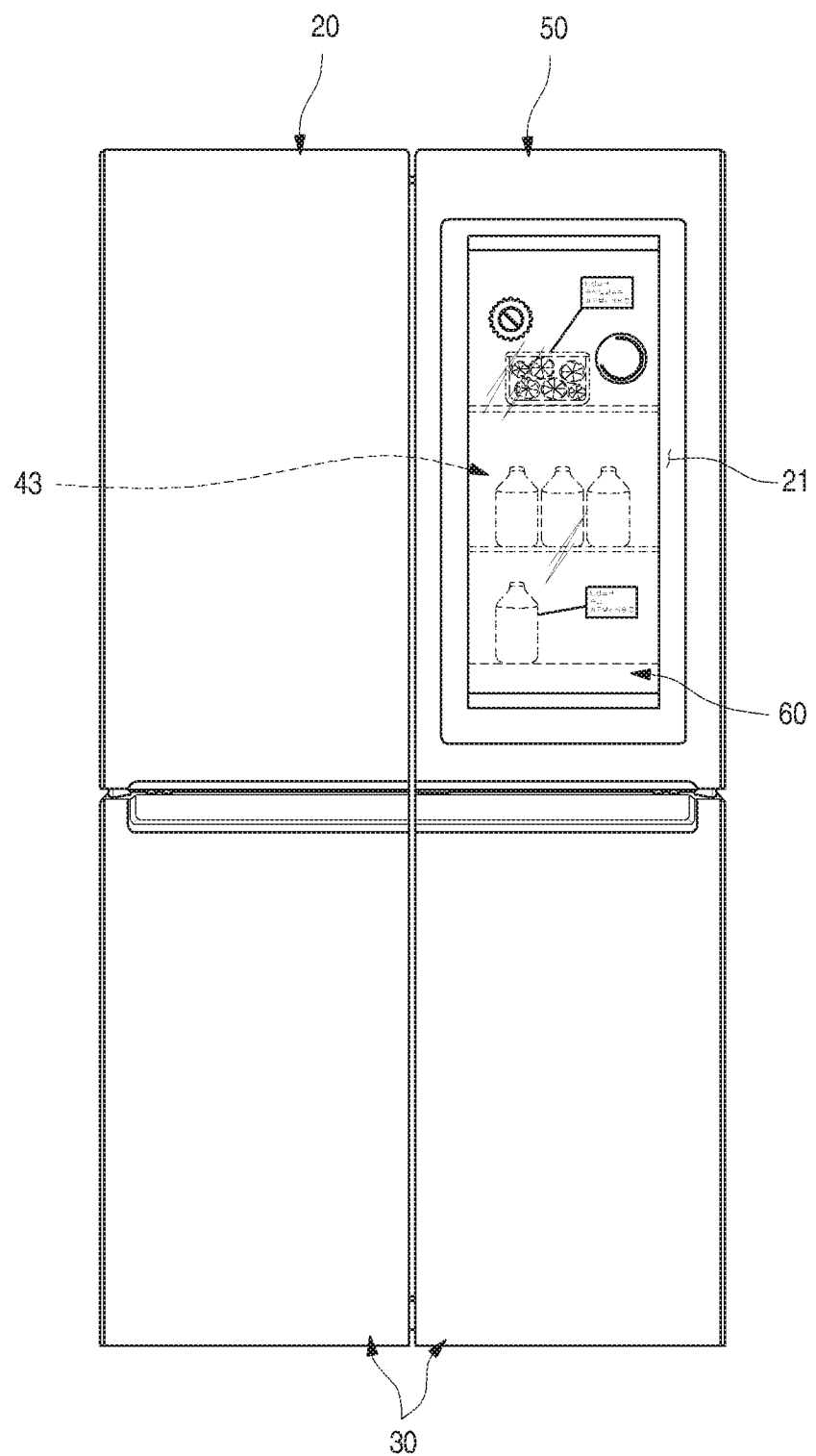
FIG. 21 is a view illustrating a state in which the inside of the refrigerator is seen through the transparent display assembly.
Figure 22:
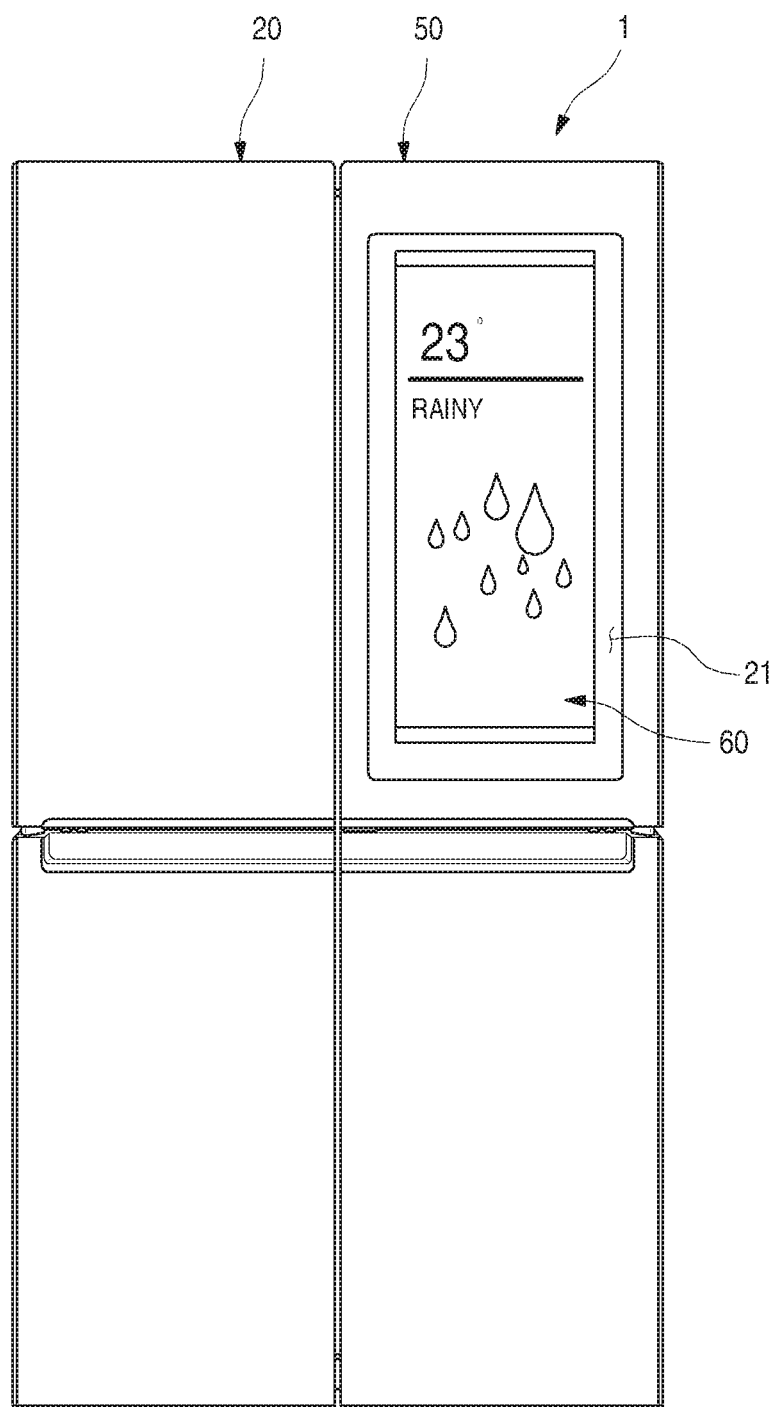
FIG. 22 is a view illustrating a state in which a screen is outputted through the transparent display assembly.

FIG. 19 is a transverse cross-sectional view of the main door and the sub door. Also, FIG. 20 is a longitudinal cross-sectional view of the main door and the sub door. Also, FIG. 21 is a view illustrating a state in which the inside of the refrigerator is seen through the transparent display assembly. Also, FIG. 22 is a view illustrating a state in which a screen is outputted through the transparent display assembly.

As illustrated in the drawings, in a state in which a locking member 593 of the opening device 59 is inserted into a latch hole 421, the sub door 50 may be maintained in a closes state. In this state, the door light 57 may be maintained in a turn-off state. An opened or closed state of the sub door 50 may be detected through a door switch that is separately provided.

In the turn-off state of the door light 57, as illustrated in FIG. 1, the rear space of the sub door 50 may be dark, and thus, the inside of the refrigerator 1 may not be seen through the see-through part 21. Thus, in the closed state of the sub door 50, if separate manipulation is not performed, the door light 57 may be maintained in the turn-off state, and the inside of the refrigerator 1 may not be seen through the see-through part 21.

In this state, the user may manipulate the front panel 61 to turn on the door light 57. When the door light 57 is turned on, light emitted from a lighting module may be emitted to positions of both rear left and right sides of the rear panel 65, which face each other.

The door light 57 may extend from the upper end to the lower end of the rear panel 65. That is, the light emitted by the door light 57 may illuminate the entire rear region of the rear panel 65 from both the left and right sides of the rear panel 65.

Here, when the display light 68 is in the turn-on state together with the door light 57, light may be emitted upward and downward by the display light 68, and thus the light may be emitted from left and right sides by the door light 57. As a result, the light may be emitted to the see-through part 21 in all directions to maximally brighten up an area of the see-through part 21.

The door light 57 may emit light in directions facing each other in a state of being close to the rear panel 65. The light emitted by the door light 57 may brighten up an inner case of the accommodation case 43 and also brighten up the front region over the rear panel 65. Thus, as illustrated in FIG. 20, the door light 57 may serve as a lighting for brightening up the inner space of the refrigerator 1, which is seen through the see-through part 21 and also serve as an auxiliary backlight for allow the display 62 to be more clearly displayed.

That is, in a state in which a screen is being outputted through the display 62, the inner space of the refrigerator 1, i.e., the rear space of the sub door 50 may be selectively seen through the see-through part 21. To allow the rear space of the sub door 50 to be seen through the see-through part 21, the door light 57 may be turned on.

A turn on/off combination of the display light 68 and the door light 57 may be variously realized according to a degree of seeing of the inside of the accommodation case 43 through the see-through part 21.

Figure 23:
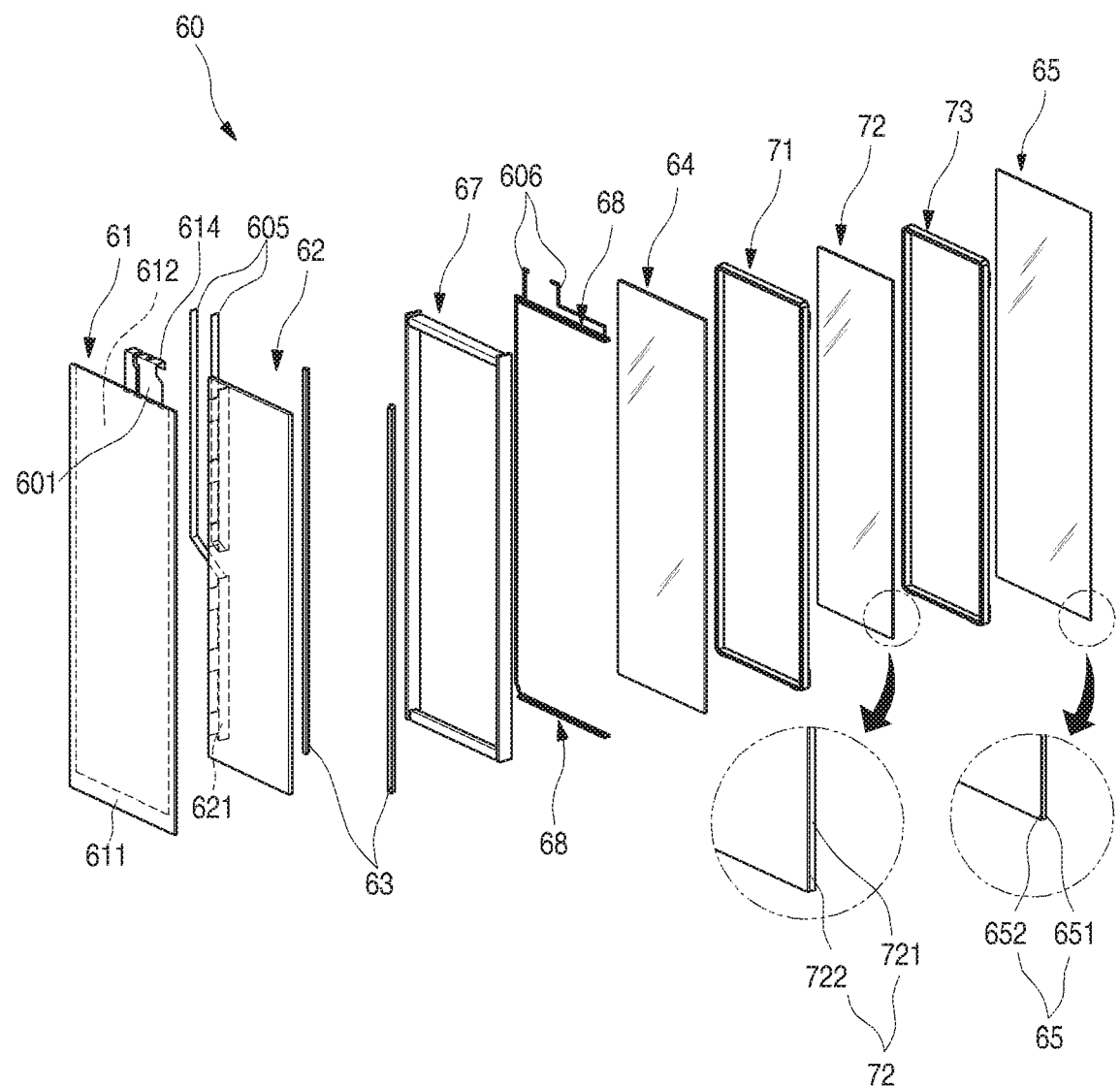
FIG. 23 is an exploded perspective view of a transparent display assembly according to a second embodiment.

Also, when the user manipulates the front panel 61 disposed on the front surface of the refrigerator 1, the display light 68 may be turned on to turn on the display 62. Thus, the transparent display assembly 60 may output a screen as illustrated in FIG. 23. Here, the manipulation of the front panel 61 may be inputted as one of a specific position, the touch number, or a pattern. As occasion demands, a separate physical button or sensor may be used to detect the user's manipulation.

A screen for displaying a state of the refrigerator 1 and manipulating may be outputted on the display 62. Here, various screens for information with respect to accommodated foods may be outputted by using Internet, image output external input devices, or the like.

In detail, the display light 69 disposed on each of the upper and lower ends of the light guide plate 64 may be turned on together with the display 62 by the user's manipulation. The light guide plate 64 may irregularly reflect and diffuse light of the display light 68 by the turn-on of the display light 68 to emit light having generally uniform brightness to the front display 62.

Also, light may be emitted to the display 62 from the rear side of the display 62 by the light guide plate 64, and simultaneously, a screen based on inputted image information may be outputted on the display 62. Thus, the user may confirm the clearly outputted screen through the see-through part 21.

In addition to the foregoing embodiment, a refrigerator according to various embodiments may be exemplified.

According to a second embodiment, an insulation panel is further provided between a light guide plate and a rear panel, and a fourth insulation layer and a third insulation layer are respectively provided at a rear side and a front side of the insulation panel. Thus, the second embodiment is the same as the foregoing embodiment except for an insulation panel within a transparent display assembly and the third and fourth spacers for mounting the insulation panel. Also, in the current embodiment, the same constituent as those of the abovementioned embodiments will be denoted by the same reference numeral, and its detailed description will be omitted.

FIG. 23 is an exploded perspective view of the transparent display assembly according to the second embodiment.

As illustrated in the drawings, a transparent display assembly 60 according to a second embodiment may have an outer appearance defined by a front panel 61, and a touch sensor 612 is disposed on a rear surface of the front panel 61. A touch cable 601 may extend upward on an upper end of the touch sensor 612.

Also, a display 62 is disposed on a rear surface of the touch sensor 612, and a first spacer 63 is disposed on each of both left and right sides of the display 62. The first spacer 63 may support both ends of a light guide plate 64, and the light guide plate 64 and the display 62 may be maintained to be spaced a predetermined distance from each other.

A source board 621 laterally protrudes from one end of the display 62 to pass between the first spacer 63 and the front panel 61 and protrude outward. The source board 621 may be bent between the first spacer 63 and the outer spacer 67 and disposed perpendicular to the front panel 61 and then connected to a display cable 605.

The outer spacer 67 is disposed outside the first spacer 63. Also, the outer spacer 67 may support upper and lower ends of the light guide plate 64. Also, a display light 68 mounted on each of upper and lower ends of and inner surface of the outer spacer 67 may emit light to upper and lower ends of the light guide plate 64. A display light cable 606 is connected to the display light 68.

A third spacer 71 having a rectangular frame shape is disposed on a rear surface of the light guide plate 64. An insulation panel 72 may be fixed to be maintained at a predetermined distance with respect to the light guide plate 64 by the spacer 71. In detail, the third spacer 71 may have the same structure as the second spacer 66 according to the foregoing embodiment except for a thickness of the third spacer 71. That is, since an insulation panel 72 has to be added while maintaining the total thickness of the transparent display assembly 60, the third spacer 71 may have a thickness less than that of the second spacer 66.

Also, the insulation panel 72 may have the same structure as the rear panel 65 to provide a glass layer 721 and an insulation coating layer 722. Thus, the transparent display assembly 60 according to the second embodiment may be improved in thermal insulation performance. A glass layer 651 and an insulation coating layer 652 may be further disposed on the rear panel to more improve the thermal insulation performance.

A fourth spacer 73 may be disposed on a rear surface of the insulation panel 72. The rear panel 65 may adhere to a rear surface of the fourth spacer 73 to maintain a preset distance between the insulation panel 72 and the rear panel 65. The fourth spacer 73 may be adequately designed according to a thickness of the third spacer 71. That is, the fourth spacer 73 may have a thickness at which the rear panel 65 adheres to the fourth spacer 73 and the rear surface of the outer spacer 67 when the rear panel 65 is mounted.

The rear panel 65 may adhere to the outer spacer 67 and then be fixed while being maintained at a predetermined distance with respect to the front panel 61. Also, the display 62, the first spacer 63, the light guide plate 64, the third spacer 71, the insulation panel 72, and the fourth spacer 73 may be successively disposed in an inner region of the outer spacer 67 between the front panel 61 and the rear panel 65.

Also, a third insulation layer 693 may be provided by the third spacer 71 between the light guide plate 64 and the insulation panel 72. Also, a fourth insulation layer 694 may be provided by the insulation panel 72 and the fourth spacer 73.

Also, the second insulation layer 692 may be provided in the outer spacer 67 to substantially insulate the entire area of the transparent display assembly 60, thereby significantly improving the thermal insulation performance of the transparent display assembly 60. If the thermal insulation performance of the transparent display assembly 60 is satisfied, one of the third and fourth insulation layers 693 and 694 may be omitted.

Figure 24:
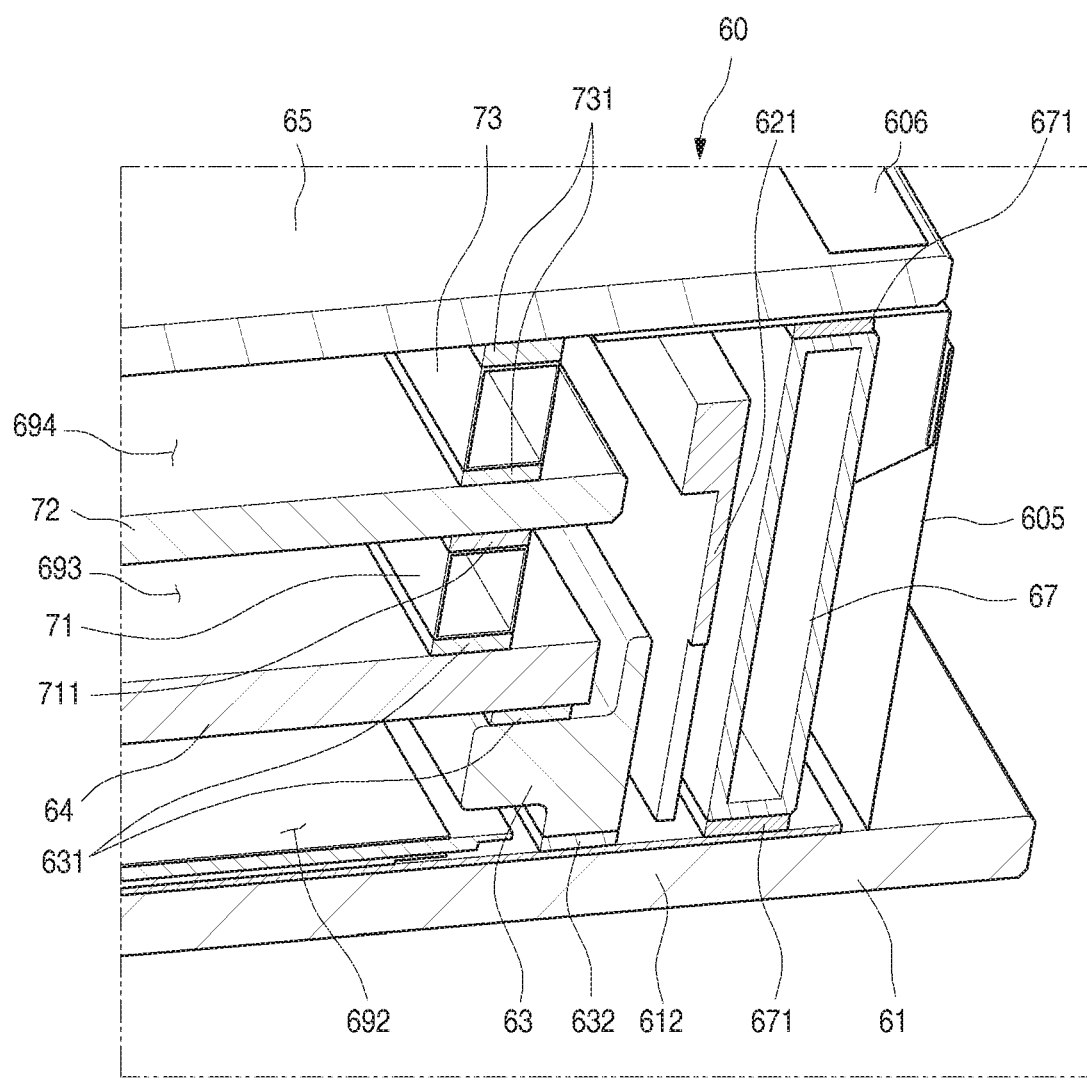
FIG. 24 is a transverse partial cutaway perspective view of the transparent display assembly.
Figure 25:
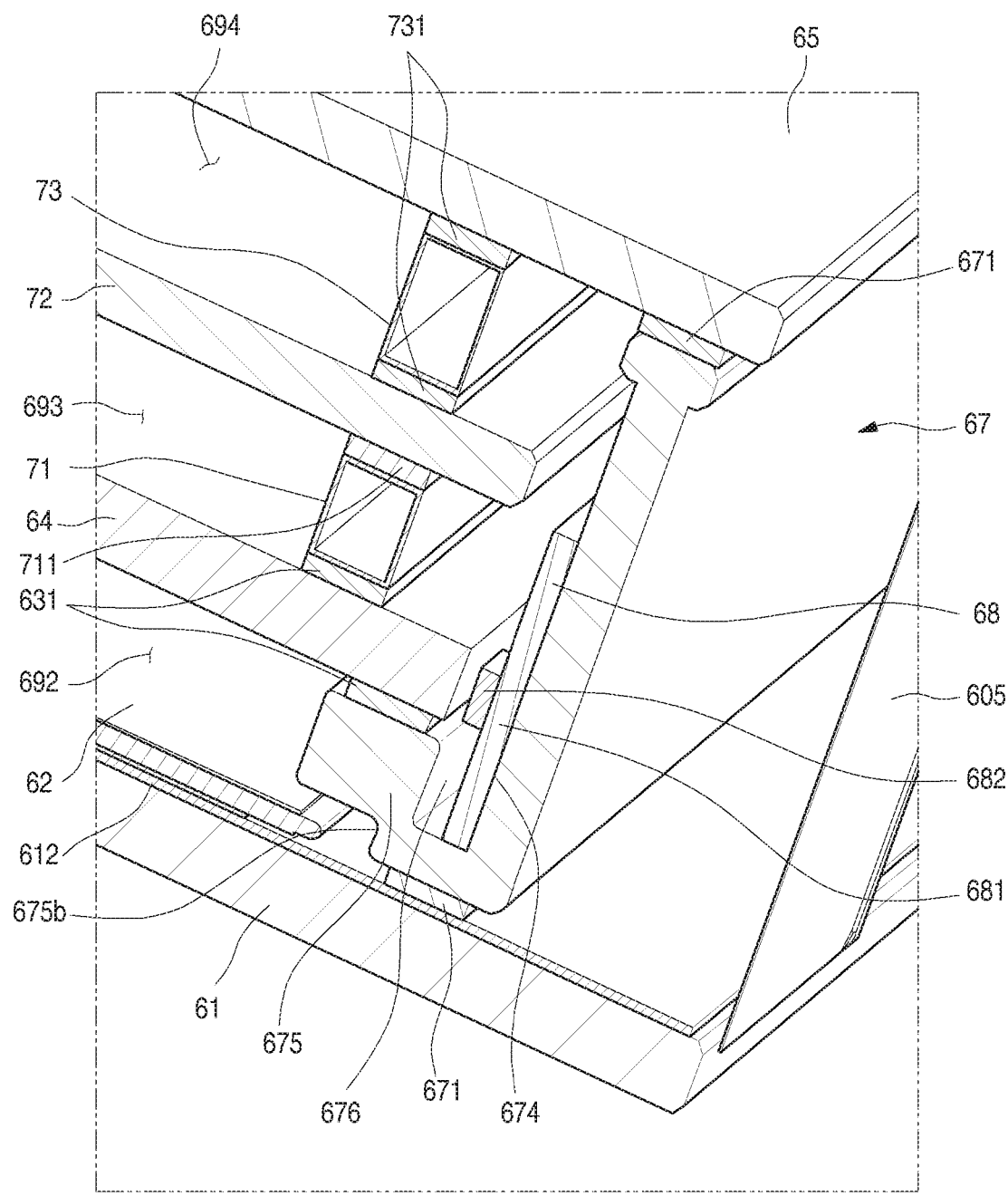
FIG. 25 is a longitudinal partial cutaway perspective view of the transparent display assembly.

FIG. 24 is a transverse partial cutaway perspective view of the transparent display assembly. Also, FIG. 25 is a longitudinal partial cutaway perspective view of the transparent display assembly.

As illustrated in the drawings, the transparent display assembly 60 includes a third insulation layer 693 sealed between the light guide plate 64 and the insulation panel 72 by the third spacer 71 and a fourth insulation layer 694 sealed between the insulation panel 72 and the rear panel 65 by the fourth spacer 73. Also, the second insulation layer 692 may be provided between the rear panel 65 and the front panel 61 by the outer spacer 67.

In detail, the outer spacer 67 may be disposed on the rear surface of the front panel 61, which has the largest area, and the display 62, the first spacer 63, the light guide plate 64, the third spacer 66, the insulation panel 72, and the fourth spacer 73 may be sequentially disposed inside the outer spacer 67. Also, the rear panel 65 may adhere to the rear surface of the outer spacer 67 to define an outer appearance of the transparent display assembly 60.

The touch sensor 612 is disposed on the rear surface of the front panel 61, and the display 62 is disposed on a rear surface of the touch sensor 612. The light guide plate 64 may be disposed at a position that is spaced a predetermined distance from the display 62 by the first spacer 63 and the outer spacer 67.

Here, since the light guide plate 64 may be contracted by heat due to the operation of the display light 68, the end of the circumference of the light guide plate 64 may not be completely fixed, and ends of the first spacer 63 and the light guide plate support part 675 may be disposed adjacent to each other without being fixed and coupled to each other. Due to this structure, the first spacer 63 may not be completely sealed, and air or a gas may flow between the inside and the outside of the first spacer 63.

The display light 68 may be disposed on the outer spacer 67, which corresponds to the upper and lower ends of the light guide plate 64. Also, the LED 682 mounted on the substrate 681 of the display light 68 may emit light to the end of the light guide plate 64 at a position corresponding to the end of the light guide plate 64.

The first spacer 63, the light guide plate 64, the third spacer 71, the insulation panel 72, and the fourth spacer 73 may be spaced apart from an inner surface of the outer spacer 67 to define a space therebetween. Also, the source board 621 may be disposed inside the outer spacer 67. Since the source board 621 is disposed, a sealed space may not be provided in the space between the front panel 61 and the light guide plate 64, which is defined by the first spacer 63.

The third spacer 71 may be disposed on the rear surface of the light guide plate 64, and the insulation panel 72 may adhere to the third spacer by using the adhesion member 711 to provide the third insulation layer 693. Also, the fourth spacer 73 may be disposed on the rear surface of the insulation panel 72, and the fourth spacer 73 and the outer spacer 67 may adhere to the rear panel 65 by using the adhesion members 731 and 671 to provide the fourth insulation layer 694 that is in a sealed state.

Also, the outer spacer 67, the front panel 61, and the rear panel 65 may adhere to each other to provide the second insulation layer 692, which is in a sealed state, in the inside of the outer spacer 67 including the space between the front panel 61 and the light guide plate 64.

Hereinafter, a process of assembling the transparent display assembly having the above-described structure and a process of forming the insulation layer will be described with reference to the accompanying drawings.

Figure 26A:
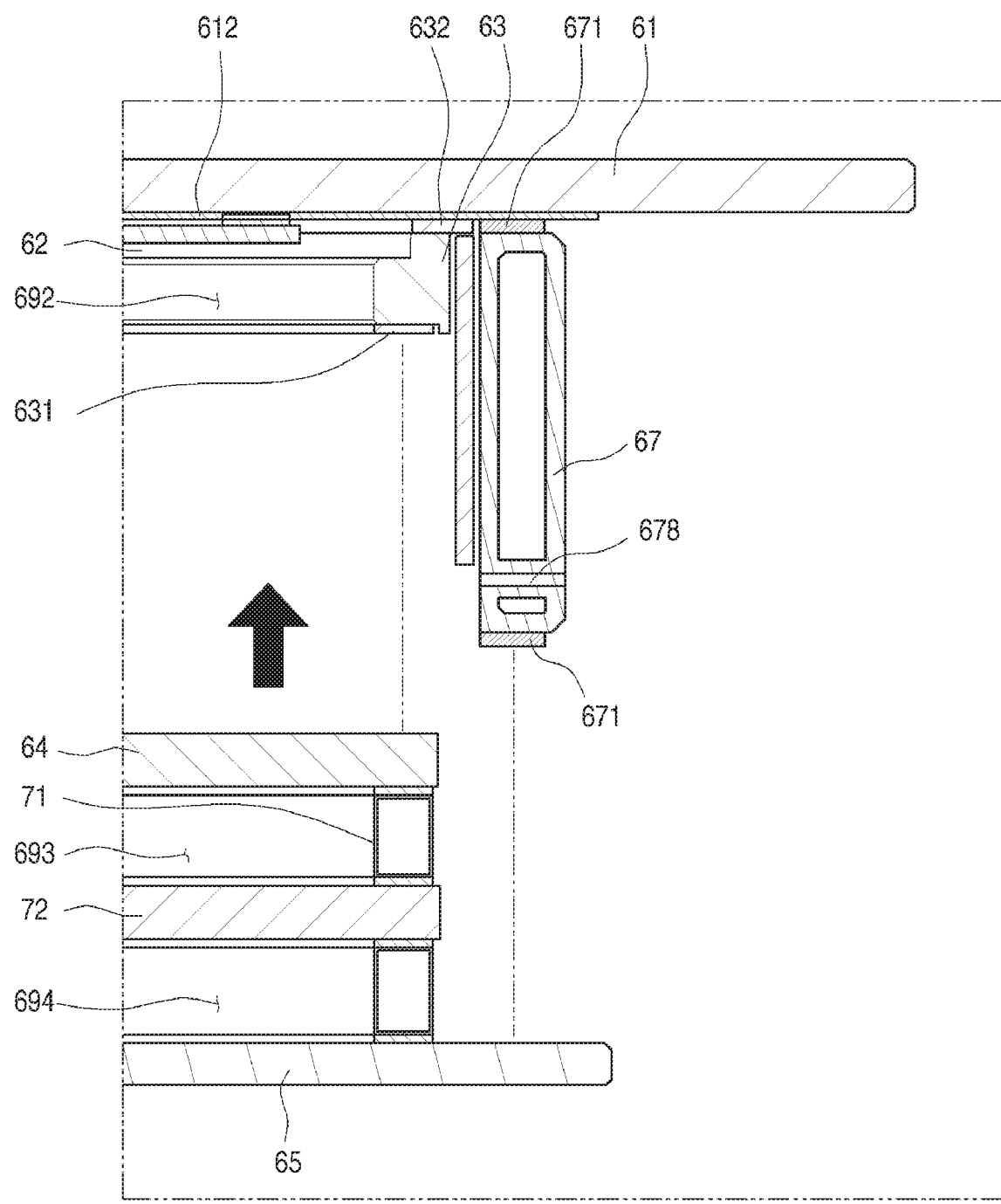
FIGS. 26A and 26B are views illustrating a process of forming an insulation layer of the transparent display assembly.
Figure 26B:
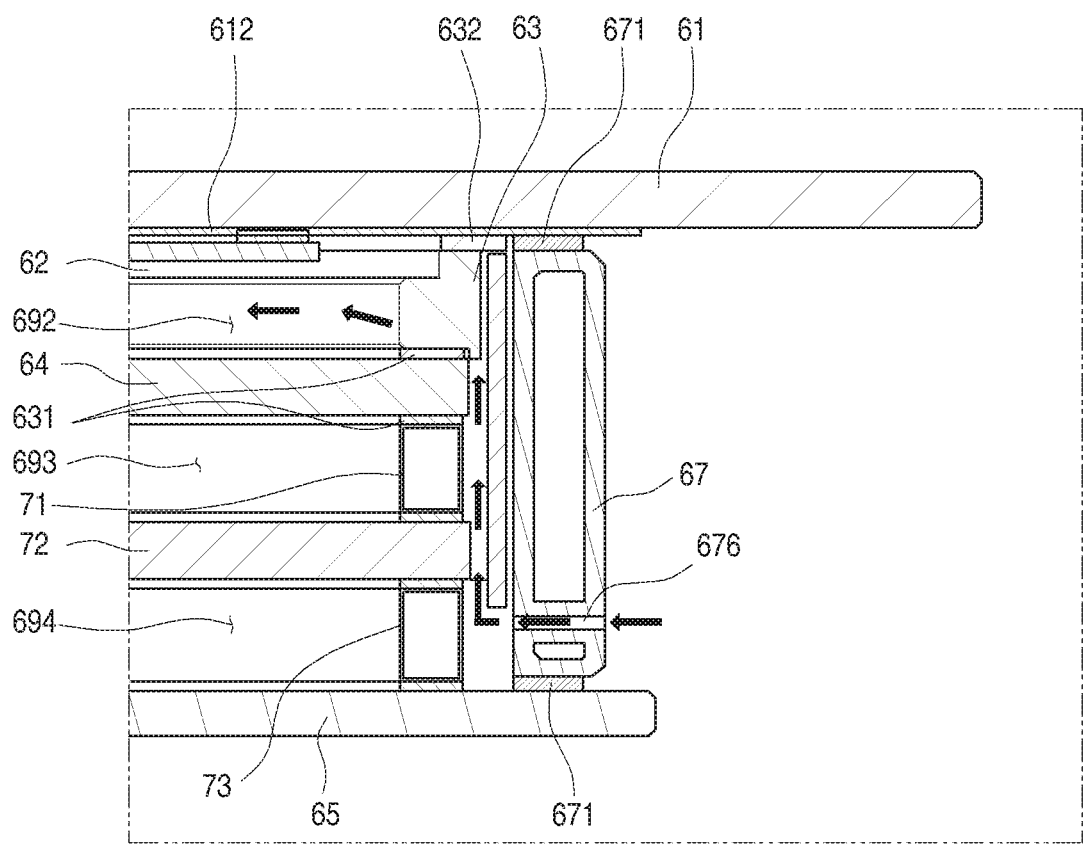

FIGS. 26A and 26B are views illustrating a process of forming the insulation layer of the transparent display assembly.

To assemble the transparent display assembly 60, the touch sensor 612 is formed on the front panel 61, and the display 62, the first spacer 63, and the outer spacer 67 are mounted on the front panel 61.

Also, the fourth spacer 73 may be mounted on the rear panel 65, and the insulation panel 72 may be attached to the fourth spacer 73 to form the fourth insulation layer 694 that is in a sealed state. Also, the third spacer 71 is mounted on the insulation panel 72, and the light guide plate 64 is seated on the third spacer 71 to form the third insulation layer 693 that is in a sealed state.

As illustrated in FIG. 26A, the front panel 61 on which the display 62, the first spacer 63, and the outer spacer 67 are mounted may be separated from the rear panel 65 on which the fourth spacer 73, the insulation panel 72, the third spacer 71, and the light guide plate 64 are mounted.

In this state, the argon gas is injected into the third insulation layer 693 and the fourth insulation layer 694, which are maintained in the seated state. In the third insulation layer 693 and the fourth insulation layer 694 are in the sealed state, the gas may be injected into the third spacer 71 and the fourth spacer 73 through injection holes defined in one side of the third and fourth spacers 71 and 73 and be discharged through discharge holes defined in the other side of the third and fourth spacers 71 and 73.

When the argon gas is completely injected, the injection hole and the discharge hole may be covered by the sealant or other covering constituents to prevent the argon gas from leaking. Alternatively, the third insulation layer 693 and the fourth insulation layer 694 may be configured so that the argon gas is injected, and the air is discharged through the injection hole and the discharge hole defined between the adhesion members 731 except for the third spacer 71 and the fourth spacer 73. That is, the gas may be injected into the third and fourth insulation layers 693 and 694 through various methods.

The transparent display assembly 60 that is in the module state may be coupled to the front panel 61 in the state in which the gas is injected into the third insulation layer 693 and the fourth insulation layer 694 as illustrated in FIG. 26A and then become the state of FIG. 26B. That is, constituents of the front panel 61 and the rear panel 65, which are partially assembled and produced at different positions, may be coupled to each other to form the transparent display assembly 60.

Here, the light guide plate 64 may be seated on and supported by the first spacer 63, and an end of the outer spacer 67 may adhere to the rear panel 65 by the adhesion member 671. The transparent display assembly 60 may be completely assembled as a whole due to the above-described structure.

Also, in the transparent display assembly 60 is completely assembled, the argon gas may be injected through the injection hole 676 of the outer spacer 67. Here, the air of the second insulation layer 692 may be discharged to the outside through a discharge hole (not shown). That is, the argon gas may be filled between the front panel 61 and the light guide plate 64 to form the second insulation layer 692 that is sealed by the outer spacer 67.

In addition to the foregoing embodiment, a refrigerator according to various embodiments may be exemplified.

A refrigerator according to a third embodiment may have a structure in which injection holes are defined in an outer spacer and a corner connection member constituting the spacer to fill a gas for thermal insulation within a transparent display assembly. Thus, the third embodiment is the same as the foregoing embodiments except for constituents of the spacer. Also, in the current embodiment, the same constituent as those of the abovementioned embodiments will be denoted by the same reference numeral, and its detailed description will be omitted. In the current embodiment, constituents (not shown) are the same as those of the abovementioned embodiments will be denoted by the same reference numeral, and their detailed description will be omitted.

Figure 27:
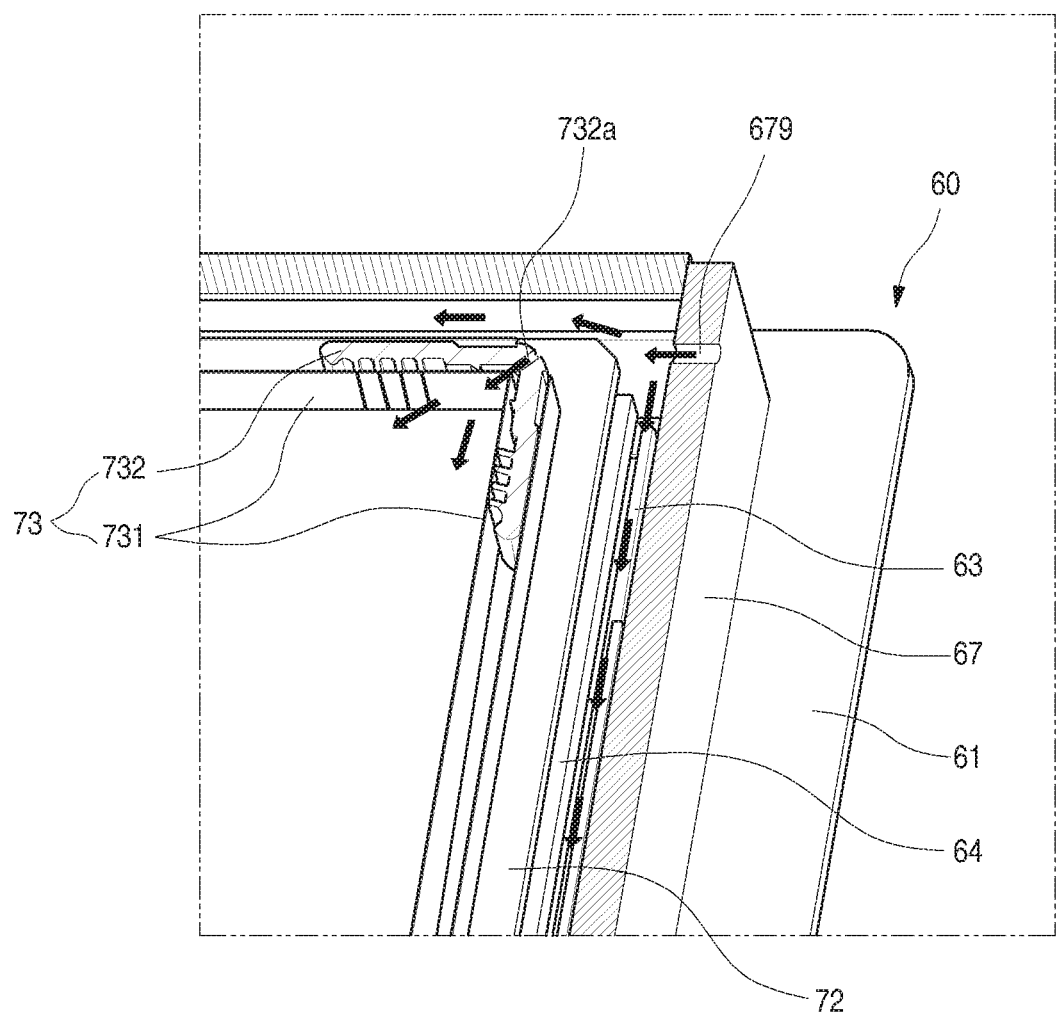
FIG. 27 is a view illustrating a process of forming an insulation layer of a transparent display assembly according to a third embodiment.

FIG. 27 is a view illustrating a process of forming an insulation layer of a transparent display assembly according to a third embodiment.

As illustrated in the drawings, a transparent display assembly 60 according to the third embodiment may have an outer appearance defined by a front panel 61, and a touch sensor 612 and a display 62 are mounted on a rear surface of the front panel 61. Also, a light guide plate may be supported by a first spacer 63. Also, an outer spacer 67 may be mounted outside the first spacer 63.

A third spacer 71 may be disposed on a rear surface of the light guide plate 64, and an insulation panel 72 may be disposed on a rear surface of the third spacer 71. Also, a fourth spacer 73 is disposed on a rear surface of the insulation panel 72, and the rear panel 65 adheres to the fourth spacer 73 and the outer spacer 67 to define a rear surface of the transparent display assembly 60.

Although the third and fourth spacers 71 and 73 and the insulation panel 72 are disposed at a rear side of the light guide plate 64 in this embodiment, the second spacer 66 instead of the third spacer 71 and the fourth spacer 73 may be disposed at the rear side of the light guide plate 64 like the first embodiment.

Also, in the transparent display assembly 60, all of a display 62, the first spacer 63, the light guide plate 64, the third spacer 71, an insulation panel 72, and the fourth spacer may be disposed in an inner region of the outer spacer 67, and the inner region of the outer spacer 67 between the front panel 61 and the rear panel 65 may be completely sealed.

The fourth spacer 73 may include four tube members 731 defining upper/lower and left/right sides and a corner member 732 connecting the adjacent tube members to each other. Also, a moisture absorbent 661 may be filled into the tube members 731. Thus, the moisture absorbent 661 may absorb moisture through a punched hole opened to the inside of the fourth insulation layer 694 to always dry the fourth insulation layer 694.

The corner connection member 732 may be injection-molded with a structure that is capable of being easily inserted into and fixed to the tube members 731 and made of a plastic material. A connection member injection hole 732a may be defined in an edge of the corner connection member 732. The connection member injection hole 732a may pass through the outside of the fourth spacer 73 to the inside of the fourth spacer 73 to communicate with the fourth insulation layer 694.

Also, an injection hole 679 is penetrated through one side of an outer portion of the outer spacer 67. The injection hole 679 may be defined in one side so that the injection hole 679 does not interfere with a source board 621 or a display light 68 and also be defined adjacent to the connection member injection hole 732a.

Thus, when a gas for thermal insulation is injected through the injection hole 679 in a state in which the transparent display assembly 60 is assembled, the gas may be filled into a second insulation layer 692 inside the outer spacer 67, and also, the gas may be injected into a fourth insulation layer 694 through the connection member injection hole 732a.

Although not shown, a discharge hole (not shown) may be further defined in one side of the outer spacer 67 and the fourth spacer 73 in a direction opposite to the injection hole 679 and the connection member injection hole 732a. Thus, since air is discharged through the discharge hole, the gas may be more smoothly injected.

Also, although not shown, the third spacer 71 may have the same structure as the fourth spacer 73. Thus, the gas introduced through the injection hole 679 may be injected through the connection member injection hole 732a of the third spacer 71 and then filled into the third insulation layer 693.

In the state in which the gas is completely injected into the transparent display assembly 60, a sealant 670 may be applied to a circumference of the outer spacer 67 to cover the injection hole 679 and the discharge hole, thereby preventing the gas within the transparent display assembly 60 from leaking.

In addition to the foregoing embodiment, a refrigerator according to various embodiments may be exemplified.

A refrigerator according to a fourth embodiment may have a structure in which an entire front surface of a door is defined by a front surface of a transparent display assembly.

Also, a portion of constituents according to the fourth embodiment is the same as those according to the foregoing embodiments. Thus, the same part will be designated by the same reference numeral, and detailed descriptions thereof will be omitted.

Figure 28:
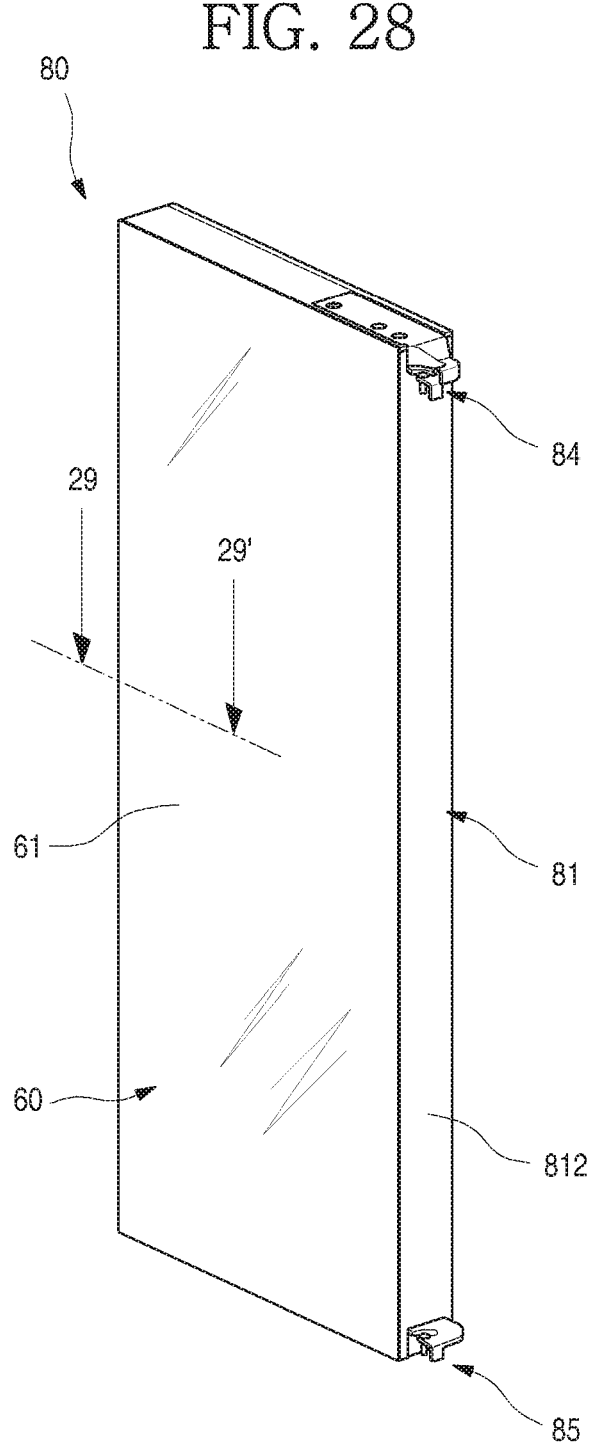
FIG. 28 is a perspective view of a door according to a fourth embodiment.
Figure 29:
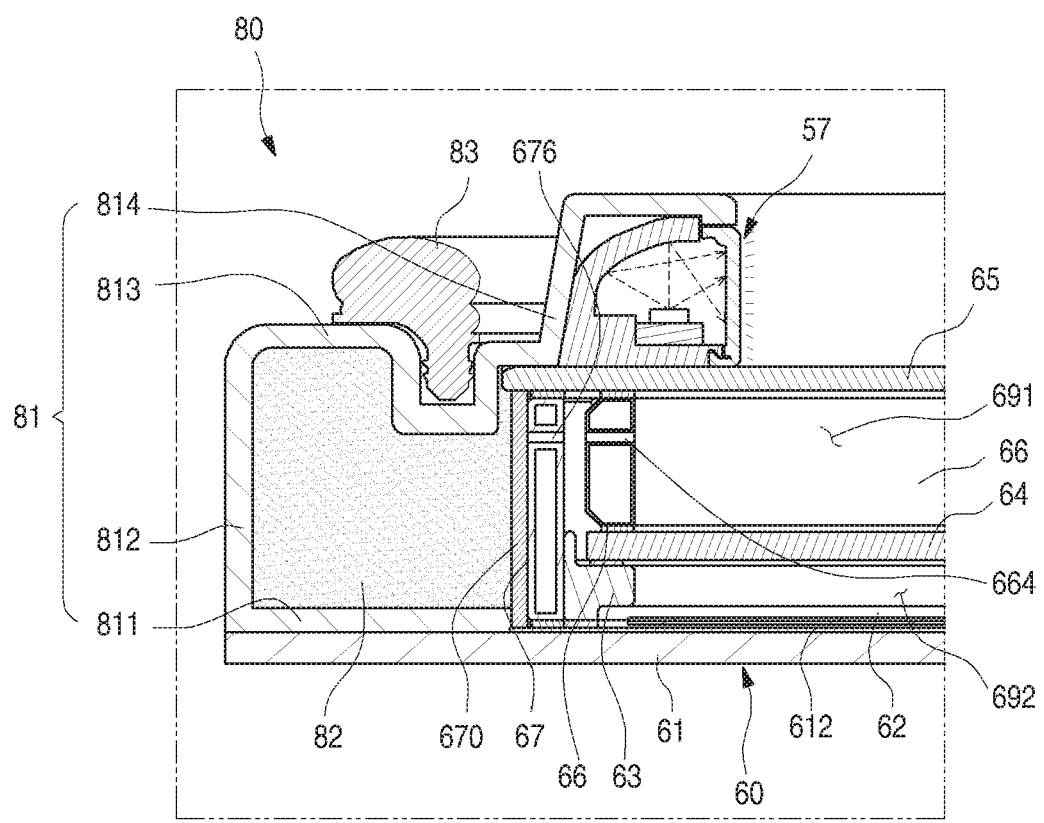
FIG. 29 is a cross-sectional view taken along line 29-29' of FIG. 28.

FIG. 28 is a perspective view of a door according to a fourth embodiment. Also, FIG. 29 is a cross-sectional view taken along line 29-29' of FIG. 28.

As illustrated in the drawings, a door 80 according to this embodiment may have an outer appearance of the entire front surface and a portion of a rear surface, which are defined by a transparent display assembly 60 and also have an outer appearance of a circumference and a portion of the rear surface, which are defined by a door liner 81. Thus, the transparent display assembly 60 may be fixedly mounted on the door liner 81.

In detail, the transparent display assembly 60 may have the same structure as that according to the first embodiment. That is, the transparent display assembly 60 may include a front panel 61, a rear panel 65, a light guide plate 64, a display panel 62, a touch sensor 612, a first spacer 63, a second spacer 66, and an outer spacer 67.

Also, injection holes 676 and 664 may be defined in the outer spacer 67 and the second spacer 66, respectively. A gas for thermal insulation may be injected through an injection hole 679. The gas is injected through the injection hole 676 from the outside of the outer spacer 67. The gas introduced into the outer spacer 67 is injected into the second insulation layer 692 between the front panel 61 and the light guide plate 64. Here, an inner space of the outer spacer 67 may be sealed and communicate between the light guide plate 64, which is supported by the first spacer 63, and the front panel 61 so that the gas for the thermal insulation is introduced.

Also, the gas introduced into the outer spacer 67 may be introduced into the second insulation layer 692 between the light guide plate 64 and the rear panel 65 through the injection hole 664 of the second spacer 66, which is disposed inside the outer spacer 67.

Thus, the gas for the thermal insulation may be filled into a hinge 85 and the second insulation layer within the transparent display assembly 60 to satisfy the thermal insulation performance of the transparent display assembly 60.

Although not shown, a discharge hole (not shown) may be defined in each of the outer spacer 67 and the second spacer 66 like the first embodiment. Thus, when the gas is injected into the first insulation layer 691 and the second insulation layer 692, air may be discharged so that the injection of the gas is more effectively performed.

Also, an insulation coating layer 652 may be further provided on the rear panel 65 to more improve the thermal insulation of the transparent display assembly 60 by using the insulation coating layer 652.

Also, the front panel 61 may define the entire front surface of the door 80, and the circumference of the front panel 61 may further protrude from the outer spacer 67 and the rear panel 65. An opaque bezel may be printed on a front protrusion 613 to prevent the other constituent coming into contact with the front protrusion 613 from being exposed through the front surface.

A door liner 81 defining a circumferential surface and a rear surface of the door 80 may be disposed on a rear surface of the front protrusion 613. The door liner 81 may include a front part 811 adhering to the circumference of the front panel 61, a side part 812 defining a circumference of a side surface of the door 80, a rear part 813 defining a circumference of the rear surface of the door 80, and a linear protrusion 814 on which the door light 57 is mounted. The front part 811, the side part 812, the rear part 813, and the linear protrusion 814 may be molded into one constituent as a whole, and as necessary, may be provided in the form in which at least two constituents are coupled to each other.

The front part 811 may come into contact with the circumference of the rear surface of the front panel 61 and be coupled by an adhesion member such as a double-sided tape or an adhesive. The side part 812 extends backward from an outer end of the front part 811 to extend up to the rear part 813, thereby defining a substantial outer appearance of the door 80, which is exposed to the outside. Also, a thickness of the door 80 may be determined according to a width of the side part 812. Thus, the side part 812 may extend to protrude to a rear side of the rear surface of the transparent display assembly 60 to provide a space in which the transparent display assembly 60 is mounted.

The rear part 813 extends from an end of the side part 812 to define the rear surface of the door 80. The rear part 813 may extend by a predetermined length, and the extending end may support an outer end of the rear panel 65. An adhesion member such as a double-sided tape or an adhesive may be disposed on the rear part 813 to adhere to the transparent display assembly 60.

Thus, the transparent display assembly 60 may have a structure in which the front panel 61 is supported by the front part 811, and the rear panel 65 is supported by the rear part 813 and then fixed to the door 80. That is, the transparent display assembly 60 may have a structure in which the front panel 61 and the rear panel 65 are inserted through the opened front surface of the door liner 81 and supported by the door liner 81 and then fixedly mounted.

A gasket 73 may be fixedly mounted on the rear surface 813. When the door 80 is closed, the gasket 73 may seal the circumference of the rear surface of the door 80 to prevent cool air within the refrigerator from leaking.

The rear part 813 may have a stepped one side to come into contact with an outer end of the rear panel 65 and thereby to guide the rear panel 65 so that the rear panel is mounted at an accurate position, and simultaneously, to prevent a foaming solution injected into the door liner 81 from leaking.

The transparent display assembly 60 may be fixedly mounted on the door liner 81, and the circumferential surface of the transparent display assembly 60 may seal a space defined by the front part 811, the side part 812, and the rear part 813. Particularly, the inside of the transparent display assembly 60 may be completely sealed by the sealant 691 applied to the outside of the transparent display assembly 60. Thus, the foaming solution may be injected into the door liner without leaking to the outside to provide an insulation material 82. Also, the insulation material 82 may come into direct contact with the circumference of the transparent display assembly 60 to more fix the transparent display assembly 60.

The linear protrusion 814 may extend backward from the end of the rear part 813 and be bent inward to define a space, in which the door light 57 is mounted, in each of both sides of the rear surface of the door 80. The door light 57 may illuminate light in directions facing each other to brighten up the rear side of the transparent display assembly 60.

An upper hinge 84 and a lower hinge 85 may be disposed on upper and lower ends of the circumferential surface of the door 80 so that the door 80 is rotatably mounted on a cabinet of the refrigerator. Also, although not shown, a handle for rotational manipulation of the door 80 may be further disposed on one side of the door 80.

The following effects may be expected in the refrigerator according to the proposed embodiments.

In the refrigerator according to the embodiments, the see-through part that sees the accommodation space may be provided in the door. The see-through part may include the transparent display and be selectively transparent or opaque according to the turn-on/off of the door light and the display light. Thus, the user may confirm the accommodation space through the see-through part by the user's manipulation without opening the door to improve the user's convenience and reduce the power consumption.

Also, in the see-through part, the display may operate according to the user's manipulation to display various screens and thereby to provide various pieces of information for the user's convenience and allow the user to input the manipulation thereof, thereby improving the user's convenience.

Also, the cables connected to the electric components of the transparent display assembly may have the flexible structure as the flat type cable. Thus, the cables may easily access between the transparent display assembly having the structure in which the plurality of panels are laminated, and the sealed state may be maintained.

Also, the cables may be bent and thus closely attached to the circumference of the transparent display assembly. Thus, the door may have the compact structure, and the interface with the insulation material may be minimized.

Also, the PCB for controlling the electric components of the transparent display assembly may be disposed at the upper, lower, or left/right sides of the transparent display assembly. In addition, since the cables connected to the PCB are also disposed along the circumference of the transparent display assembly, the PCB or the cables may not be exposed to the outside through the transparent display assembly. That is, the inside of the refrigerator may be seen through the transparent display assembly that is capable of outputting the screen. Here, the interference with the PCB or the cables may be prevented.

Also, the cables connected to the electric components of the transparent display assembly may be accessible through the circumferential surface of the transparent display. Particularly, in case of the source board, the cables may pass between the first spacer and the front panel, and thus, the sealing at the portion through which the cables pass may be impossible. Also, although the first spacer having the portion on which the display light is disposed and the portion supporting the light guide plate has a structure in which the light guide plate is not sealed, the outer spacer may be disposed outside the first spacer to seal the gap between the front panel and the rear panel. In addition, the injection hole for injecting the gas into the outer spacer may be provided to inject the gas for the insulation into the outer spacer to form the insulation layer between the front panel to which the display is attached and the light guide plate.

Also, at least one or more panels may be further provided at the rear side of the light guide plate, and the distance between the light guide plate and the panel may be maintained. Also, the injection hole may be provided in the spacer to inject the insulation gas introduced through the injection hole of the outer spacer into the spaces between the plurality of panels through the spacer, thereby significantly improving the insulation performance of the transparent display assembly.

Also, the sealant may be applied to the circumference of the outer spacer to completely seal the injection hole on the outer spacer and the portion of the outer spacer, through which the plurality of film-type cables guided to the outside through the circumferential surface pass. Thus, the gas for the insulation in the transparent display assembly may be prevented from leaking, and the insulation performance may be maintained.

Also, when the insulation gas is injected through the outer spacer, the spacer provided in the outer spacer may be constituted by the plurality of tube members and the corner connection member connecting the tube members to each other and made of the plastic material. Also, the connection member injection hole may be defined in the corner connection member so that the gas is introduced into the insulation layer. Thus, the structure for injecting the gas may be simply realized without processing the tube members.

Also, the plurality of insulation layers in which the insulation gas is filled may be provided in the transparent display assembly to improve the insulation performance of the transparent display assembly.

Also, in the rear panel or the rear panel and the insulation panel of the transparent panels constituting the transparent display assembly except for the front panel, to which the touch sensor for the touch operation is attached, and the light guide plate, the insulation coating layer formed by applying the metal oxide to the surface of the glass layer may be provided to block and reflect the radiant heat, thereby more improving the insulation performance of the transparent display assembly.

Also, the insulation coating layer may not be provided to the front panel, to which the touch sensor is attached, to secure the touch recognition performance. In addition, the insulation layer in which the gas is filled may be provided inside the transparent display assembly to secure the insulation performance.

Also, the transparent display assembly may have the sealed space therein by the outer spacer connecting the front panel to the rear panel. Also, the display and the light guide plate may be accommodated in the inner space of the outer spacer to provide the multilayered panel structure.

As described above, in the multilayered panel structure, the multilayered inner space may be sealed by the sealing structure due to the outer spacer may be naturally realized. In addition, although the multilayered panel structure is further provided in the inner space of the outer spacer, the entire sealing of the transparent display assembly may be achieved by only the sealing of the outer spacer to improve the thermal insulation performance and the assemblability.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
    a cabinet;
    a door configured to open or close the cabinet, the door having an opening formed therethrough; and
    a transparent display assembly that covers the opening and that allows an inner space of the refrigerator to be visible through the transparent display assembly,
    wherein the transparent display assembly comprises:
        a first panel;
        a second panel provided behind the first panel;
        an outer spacer provided between the first panel and the second panel to define a first space between the first panel and the second panel;
        a display panel provided within the first space;
        an insulation panel provided within the first space and provided between the display panel and the second panel;
        a first inner spacer provided within the first space and provided between the insulation panel and the second panel to define a second space between the insulation panel and the second panel, the second space being provided within the first space, and
        a display cable that passes between the second panel and the outer spacer or between the first panel and the outer spacer, the display cable being connected to the display panel.

2. The refrigerator according to claim 1, further comprising at least one first adhesion member provided on at least one side of the first inner spacer, the at least one first adhesion member being configured to adhere the second panel to the insulation panel via the first inner spacer.

3. The refrigerator according to claim 1, further comprising:
    a light guide plate provided between the display panel and the insulation panel, the light guide plate being configured to guide light to the display panel; and
    a second inner spacer provided at a rear surface of the first panel and configured to support the light guide plate, the second inner spacer being provided within the first space.

4. The refrigerator according to claim 3, further comprising a third inner spacer provided on the insulation panel, the third inner spacer defining a third space between the light guide plate and the insulation panel.

5. The refrigerator according to claim 4, further comprising a second adhesion member provided on a rear surface of the third inner spacer, the second adhesion member being configured to adhere the insulation panel to the third inner spacer.

6. The refrigerator according to claim 4, further comprising a first support pad provided on a front surface of the third inner spacer, the first support pad being configured to contact a rear surface of the light guide plate.

7. The refrigerator according to claim 3, further comprising a second support pad provided on a surface of the second inner spacer, the second support pad being configured to contact a front surface of the light guide plate.

8. The refrigerator according to claim 3, wherein the outer spacer comprises:
    a first injection hole configured to receive an inert gas to fill the first space; and
    a first insulation layer provided in the first space between the first panel and the light guide plate and configured to receive the inert gas.

9. The refrigerator according to claim 8, further comprising a sealant provided at an outer surface of the outer spacer, wherein the first injection hole is configured to be covered by the sealant.

10. The refrigerator according to claim 9, wherein the display cable passes through the sealant.

11. The refrigerator according to claim 3, wherein the first space defined by the outer spacer is configured to communicate with a space between the first panel and the light guide plate.

12. The refrigerator according to claim 4, wherein the first inner spacer defines a second injection hole, and wherein the second space is configured to receive the inert gas through the second injection hole and to provide a second insulation layer between the insulation panel and the second panel.

13. The refrigerator according to claim 4, wherein the third inner spacer defines a third injection hole, and wherein the third space is configured to receive the inert gas through the third injection hole and to provide a third insulation layer between the light guide plate and the insulation panel.

14. The refrigerator according to claim 3, wherein the transparent display assembly further comprises a source board that is arranged at one end of the display between the first panel and the second inner spacer and that extends from the first panel toward the second panel along an outside of the second inner spacer.

15. The refrigerator according to claim 14, wherein the source board is provided in a space between the second inner spacer and the outer spacer.

16. The refrigerator according to claim 14, wherein the source board includes a surface perpendicular to the rear surface of the first panel.

17. The refrigerator according to claim 14, wherein the display cable is configured to connect the source board to a timing controller (T-CON) board that is arranged outside the transparent display assembly.

18. The refrigerator according to claim 1, wherein the transparent display assembly further comprises a touch sensor provided on a rear surface of the first panel and configured to detect a user's touch input, and wherein the touch sensor is configured to connect, through a touch cable, to a printed circuit board (PCB) provided outside of the transparent display assembly.

19. The refrigerator according to claim 3, wherein the transparent display assembly further comprises:
  a display light configured to emit light toward an edge of the light guide plate, and provided on at least one of a first inner side of the outer spacer or a second inner side of the outer spacer facing toward the first inner side of the outer spacer, and
  a display light cable configured to connect to a PCB provided outside of the transparent display assembly, the display light cable passing between the outer spacer and the second panel.

20. The refrigerator according to claim 1, wherein the display cable has a film shape and is flexible.

* * * * *